United States Patent
Beckman et al.

(10) Patent No.: US 9,802,702 B1
(45) Date of Patent: *Oct. 31, 2017

(54) UNMANNED AERIAL VEHICLE MOTOR DRIVING RANDOMIZATION FOR NOISE ABATEMENT

(71) Applicant: Amazon Technologies, Inc., Seattle, WA (US)

(72) Inventors: Brian C. Beckman, Newcastle, WA (US); Fabian Hensel, Seattle, WA (US); Atishkumar Kalyan, Seattle, WA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,492

(22) Filed: Aug. 2, 2016

Related U.S. Application Data

(63) Continuation of application No. 14/843,560, filed on Sep. 2, 2015, now Pat. No. 9,422,055.

(51) Int. Cl.
*B64C 39/00* (2006.01)
*B64C 39/02* (2006.01)

(52) U.S. Cl.
CPC ...... *B64C 39/024* (2013.01); *B64C 2201/027* (2013.01); *B64C 2201/042* (2013.01); *B64C 2201/108* (2013.01); *B64C 2201/128* (2013.01); *B64C 2220/00* (2013.01)

(58) Field of Classification Search
CPC ............ B64C 39/024; B64C 2201/042; B64C 2201/108; B64C 2220/00; B64C 2201/027; B64C 2201/128

USPC ........................................................ 701/3, 23
See application file for complete search history.

(56) References Cited

U.S. PATENT DOCUMENTS

| | | |
|---|---|---|
| 7,970,532 B2 | 6/2011 | Tehan et al. |
| 9,087,451 B1 | 7/2015 | Jarrell |
| 2005/0271221 A1 | 12/2005 | Cerwin |
| 2012/0292441 A1 | 11/2012 | Drela et al. |
| 2015/0176515 A1 | 6/2015 | Barber et al. |
| 2015/0321758 A1 | 11/2015 | Sarna, II |
| 2016/0012730 A1 | 1/2016 | Jarrell |
| 2016/0063987 A1 | 3/2016 | Xu et al. |
| 2016/0082460 A1* | 3/2016 | McMaster ............... B05B 9/007 701/2 |

* cited by examiner

*Primary Examiner* — Tyler J Lee
(74) *Attorney, Agent, or Firm* — Lee & Hayes, PLLC

(57) ABSTRACT

This disclosure is directed to varying a speed of one or more motors in an unmanned aerial vehicle (UAV) to reduce unwanted sound (i.e., noise) of the UAV. A UAV may include motors coupled with propellers to provide lift and propulsion to the UAV in various stages of flight, such as while ascending, descending, hovering, or transiting. The motors and propellers may generate noise, which may include a number of noise components such as tonal noise (e.g., a whining noise such as a whistle of a kettle at full boil) and broadband noise (e.g., a complex mixture of sounds of different frequencies, such as the sound of ocean surf). By varying the controls to the motors, such as by varying the speed or revolutions per minute (RPM) of a motor during operation by providing random or pseudo-random RPM variations, the UAV may generate a noise signature with reduced tonal noise.

20 Claims, 12 Drawing Sheets

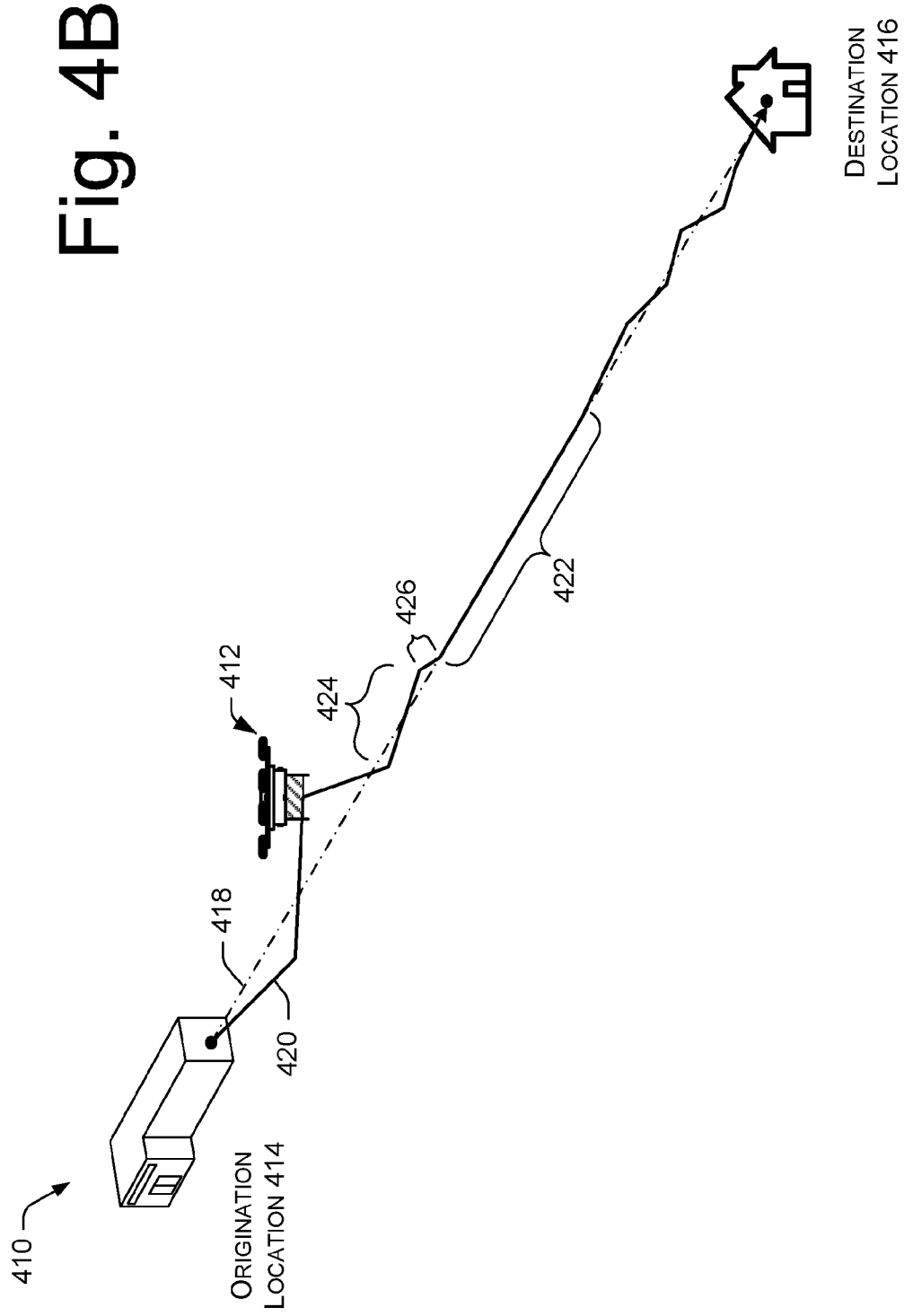

UNMANNED AERIAL VEHICLE MOTOR DRIVING RANDOMIZATION FOR NOISE ABATEMENT

CROSS REFERENCE TO RELATED APPLICATIONS

This patent application is a continuation of and claims priority to U.S. Utility patent application with Ser. No. 14/843,560, filed Sep. 2, 2015. Application Ser. No. 14/843,560 is fully incorporated herein by reference.

BACKGROUND

Unmanned aerial vehicles (UAVs) are typically used by hobbyists, some commercial entities, and various militaries. UAVs offer unique advantages, such as the ability to make UAVs smaller in overall size and lightweight as compared to their counterpart manned aerial vehicles (e.g., human-piloted helicopters and fixed wing aircraft). Some UAVs may operate in urban and residential areas, such as when transmitting packages to customers.

UAVs generate noise during flight, which may disturb or annoy customers or other people. Although some of the disturbance and annoyance may be mitigated by modifications to flight paths, this solution is not complete, and thus may still result in some disruption and annoyance by customers or other people.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4B is a graphic representation of a flight path of the UAV, in accordance with embodiments of the disclosure.

DETAILED DESCRIPTION

Figure 1:
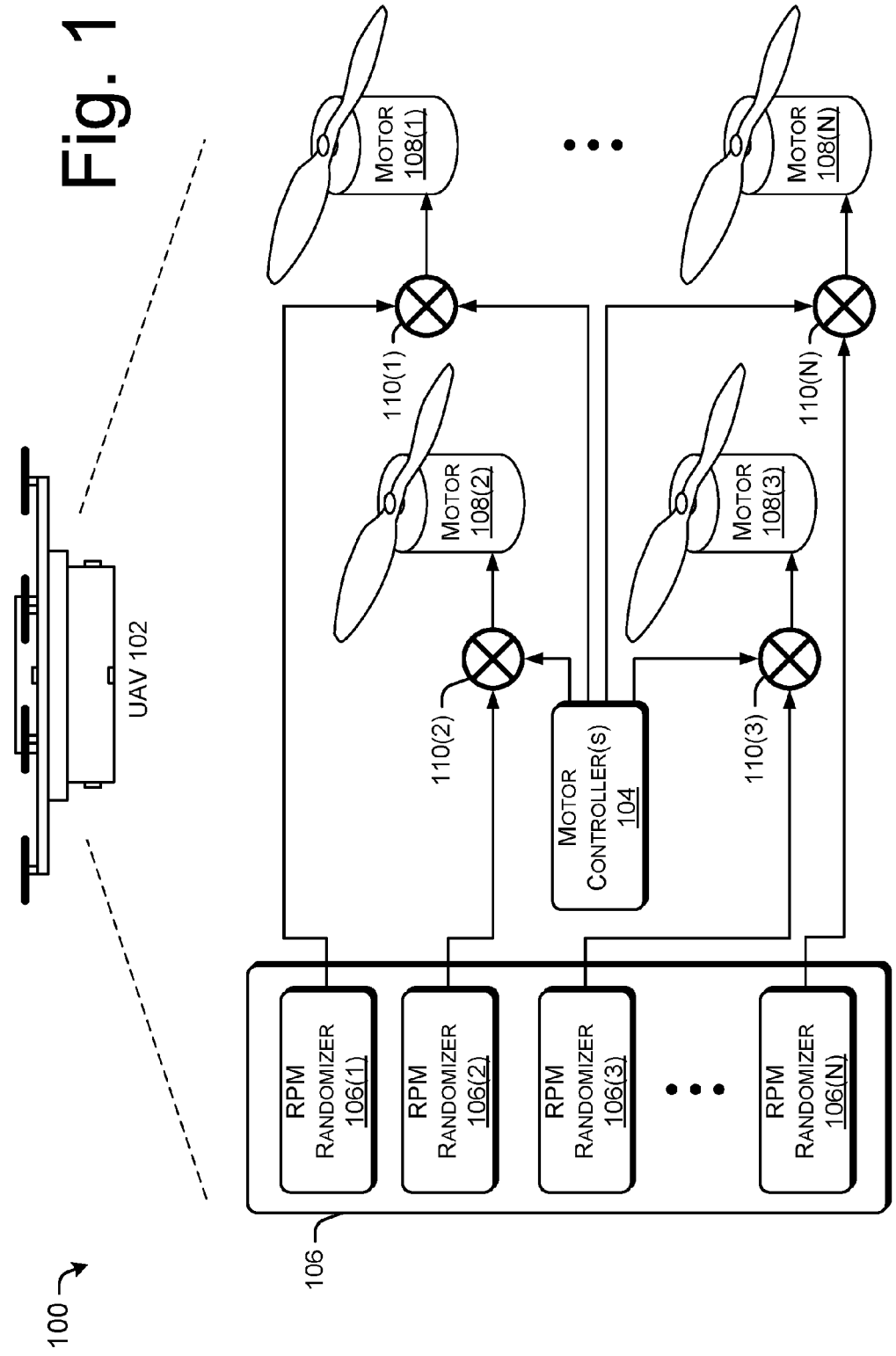
FIG. 1 is a schematic diagram showing a UAV including a motor controller and revolutions per minute (RPM) randomizers for noise abatement, in accordance with embodiments of the disclosure.

This disclosure provides methods, apparatuses, and systems for varying a speed of motors in an unmanned aerial vehicle (UAV) to reduce the unwanted sound characteristics (i.e., noise) of a UAV. For example, the UAV may have four, six, eight, or any number of motors coupled with propellers (also referred to as "rotors") to provide propulsion to the UAV. In various stages of flight, such as while ascending, descending, hovering, or transiting, the UAV controls the motors to provide lift and propulsion. While the UAV motors operate to provide lift and propulsion, the motors and propellers generate noise (i.e., unwanted sound), which may include a number of noise components such as tonal noise (e.g., a whining noise such as a whistle of a kettle at full boil) and broadband noise (e.g., a complex mixture of sounds of different frequencies, such as the sound of ocean surf). By varying the controls to the motors, such as by varying the speed or revolutions per minute (RPM) of a motor during operation, the UAV may generate a noise signature with reduced tonal noise.

In various embodiments, the UAV may increase or decrease an individual motor's RPM to be different than another motor's RPM during a flight operation. In some examples, the motor RPM variations may be random inputs or a pattern designed to reduce a noise characteristic during a particular stage of flight. Motor RPM variations may be provided to some or all of the motors for the UAV, and may be unique for each individual motor. In some embodiments, a noise signature of the UAV may be monitored during operation, and audio feedback may be provided to the UAV to vary the control of the motors to alter the noise signature. In some embodiments, a vibration characteristic of the UAV may be monitored and provided as feedback to reduce tonal noise. In some embodiments, a center of gravity of the UAV may be changed by moving one or more weights or ballast in the UAV, to either compensate for a variation in one or more motor RPMs, or to destabilize the UAV to require varying motor RPMs for a particular flight operation.

In various embodiments, motor RPM variations (i.e., the noise abatement techniques) may be based in part on a flight stage of the UAV (including associated flight controls such as position, heading, and/or velocity), payload characteristics (e.g., size, weight, aerodynamic characteristics), and/or UAV resource availability (e.g., power resources). For example, the motor RPM variations may be applied during a hover operation or descent to deliver a package, but may not be applied during normal transit. Further, the noise abatement techniques may be selectively applied when the UAV is in a noise-sensitive location, such as a residential location, while the noise abatement techniques may be disabled in other areas such as rural areas, industrial areas, etc.

The techniques, apparatuses, and systems described herein may be implemented in a number of ways. Example implementations are provided below with reference to the following figures.

FIG. 1 is a schematic diagram 100 showing a UAV 102 including motor controller(s) 104 and RPM randomizers 106(1), 106(2), 106(3), ..., 106(N) (identified collectively as RPM randomizer 106) to reduce tonal noise, in accordance with embodiments of the disclosure. The UAV 102 may include motors 108(1), 108(2), 108(3), ..., 108(N). In some embodiments, the UAV 102 may not receive feedback (in the form of audio feedback or vibration feedback) to control the RPM randomization for noise abatement.

The motor controller(s) 104 may provide motor control to the motors 108(1), 108(2), 108(3), . . . , 108(N). In some embodiments, the motor controller(s) 104 may include individual motor controllers for the individual motors 108(1), 108(2), 108(3), . . . , 108(N). In some embodiments, the motor controller(s) 104 may operate to provide a duty cycle (e.g., a percentage of one period in which a signal is active) to the motors 108(1), 108(2), 108(3), . . . , 108(N) to rotate at an intended revolutions per minute (RPM) (i.e., a baseline RPM, or an ideal RPM) during a stage of flight. For example, by increasing or decreasing the duty cycle of the motor controller(s) 104, the RPM of the motors 108(1), 108(2), 108(3), . . . , 108(N) may increase or decrease accordingly. In some embodiments, the motor controller(s) 104 may generate a target value for the RPM of an individual motor 108(1), 108(2), 108(3), . . . , 108(N) to perform an operation, such as transit or hovering. For example, the motor controller may specify that the motors 108(1), 108(2), 108(3), . . . , 108(N) rotate at 3000 RPM. In such a case, the specified RPM would be translated into appropriate controls (e.g., a duty cycle, motor pulses, or a frequency) to operate or drive the motors 108(1), 108(2), 108(3), . . . , 108(N). As may be understood in the context of this disclosure, the numerical values stated herein (e.g., 3000 RPM) are exemplary and are not limited to the express values indicated herein.

The RPM randomizer 106 (including RPM randomizers 106(1), 106(2), 106(3), . . . , 106(N)) may provide random inputs that, together with input from the motor controller(s) 104, may provide control for the motors 108(1), 108(2), 108(3), . . . , 108(N). For example, the RPM randomizer 106(1) may provide inputs to increase or decrease the RPM of the motor 108(1) in accordance with embodiments of the disclosure. The RPM randomizer 106(1) may modify a duty cycle output by the motor controller(s) 104, or may increase or decrease the duty cycle output by the motor controller(s) 104 for the motor 108(1). In some embodiments, the RPM randomizer 106(1) may specify an absolute variation (e.g., increase the RPM by 300) or a relative variation (e.g., decrease the RPM by 10 percent) away from the baseline RPM intended for the motor 108(1). In some embodiments, the RPM randomizer 106(1) may specify a time period to operate the motor with the input from the RPM randomizer 106(1) (e.g., increase the RPM by 50 and hold for 1 second). The RPM randomizer 106(1) and the motor controller(s) 104 are shown schematically as combining at summation 110(1), but it may be understood in the context of this disclosure that the RPM randomizer 106(1) may be applied to the motor controller(s) 104 in any manner.

The RPM randomizers 106(2), 106(3), . . . , 106(N) may provide random inputs that, together with input from the motor controller(s) 104, may provide control for the motors 108(2), 108(3), . . . , 108(N), respectively. In some embodiments, the RPM randomizers 106(2), 106(3), . . . , 106(N) may operate in a similar manner as the RPM randomizer 106(1), that is to say, the RPM randomizers 106(2), 106(3), . . . , 106(N) may provide absolute or relative RPM variation, for any period of time, for the motors 108(2), 108(3), . . . , 108(N), respectively. In some embodiments, the RPM randomizers 106(1), 106(2), 106(3), . . . , 106(N) may operate independently, while in some embodiments, the RPM randomizers 106(1), 106(2), 106(3), . . . , 106(N) may operate with some level of interdependence (e.g., to ensure that the RPM variations are not the same for the motors 108(1), 108(2), 108(3), . . . , 108(N), or to ensure a position of the UAV is within a position threshold, a boundary threshold, or an intended course, as discussed further below).

Similar to the discussion above, the RPM randomizer 106(2) is shown schematically as combining with the motor controller(s) 104 at summation 110(2), but it may be understood in the context of this disclosure that the RPM randomizer 106(2) may be applied to the motor controller(s) 104 in any manner. Similarly, summations 110(3) and 110(N) may operate in any matter consist with the context of this disclosure.

While the terms "RPM randomizer" and "random" may be used in this disclosure, the operations of the RPM randomizers 106(1), 106(2), 106(3), . . . , 106(N) may not be truly random, and may be considered to be pseudo-random. For example, the RPM randomizers 106(1), 106(2), 106(3), . . . , 106(N) may include thresholds for an upper-bound (i.e., an upper threshold speed) and a lower-bound (i.e., a lower threshold speed) for the variations in the RPM (e.g., away from a baseline RPM or an intended RPM), may be adjusted by a scaling factor depending on a stage of flight, or may include a pattern or sequence of RPM variations that have been predetermined to result in an optimized noise signature. In some embodiments, the outputs of the RPM randomizers 106(1), 106(2), 106(3), . . . , 106(N) may depend on the flight stage, flight controls, payload characteristics, resource availability, and/or weather conditions, for example. In some embodiments, the upper threshold speed and/or the lower threshold speed may depend on the flight stage or flight controls. In another embodiment, the output of a first one or more the RPM randomizers 106(1), 106(2), 106(3), . . . , 106(N) may be random, while the output of a second one or more of the RPM randomizers 106(1), 106(2), 106(3), . . . , 106(N) may be determined based on the first RPM randomizer to counteract control issues associated with the UAV.

In some embodiments, the outputs of the RPM randomizers 106(1), 106(2), 106(3), . . . , 106(N) are set, limited, or monitored to ensure a position of the UAV remains within a range, a position threshold, or a desired course. For example, varying the RPM of the motors 108(1), 108(2), 108(3), . . . , 108(N) may change the position of the UAV 102, for example, by increasing or decreasing altitude, translating the UAV 102 forward, backward, left or right, by introducing spin, or by altering a heading, pitch, yaw, or roll of the UAV 102. A deviation from an intended flight path may be allowed within a predetermined range, position threshold, or course boundaries, which may depend on the flight stage or flight controls of the UAV. In some embodiments, if the UAV is determined to be outside of the predetermined range, position threshold, or desired course, the UAV 102 may take corrective action to reposition the UAV 102. In some embodiments, a RPM randomization algorithm, pattern, or sequence may be adjusted based on a determination that the UAV 102 is exceeding operational boundaries (e.g., a positional boundary, a position threshold, or a predetermined range, position, or course) more than a threshold amount.

The RPM randomizers 106(1), 106(2), 106(3), . . . , 106(N) may operate continuously, periodically, or at any frequency or interval for the motors 108(1), 108(2), 108(3), . . . , 108(N) of the UAV. Further, the RPM randomizers 106 may operate at any frequency or interval independently for each UAV motor, or some or all of the RPM randomizers 106 may operate at a same frequency or interval. As a non-limiting example, the RPM randomizer 106(1) may provide a random motor speed for motor 108(1) at a first interval or frequency (e.g., 5 Hz (Hertz, cycles per second)), while the RPM randomizer 106(2) may provide a random motor speed for motor 108(2) at a second interval or frequency (e.g., 20 Hz). In another non-limiting example, one or more of the RPM randomizers 106 may provide a random motor speed for one of the motors 108 at random or irregular intervals. Thus, the rate at which the motor speeds are to be updated may vary for individual motors, or may be an additional layer of randomization to further reduce the tonal noise, in accordance with embodiments of the disclosure.

The UAV 102 may include four motors 108(1), 108(2), 108(3), . . . , 108(N), or may include any number motors, such as six or eight motors, with each individual motor coupled with a propeller or rotor. The motors 108(1), 108(2), 108(3), . . . , 108(N) may operate using alternating current (AC) or direct current (DC). As a non-limiting example, the motors 108(1), 108(2), 108(3), . . . , 108(N) may include any type of motor, such as a brushed or brushless motor, a commutated or uncommutated motor, a stepper motor, or a servomotor. Further, the motors 108(1), 108(2), 108(3), . . . , 108(N) may be individually coupled with a propeller or rotor comprising any number of blades. For example, the propellers may include two, three, four, five, or six blades. Further, there is no requirement that the propellers for the motors 108(1), 108(2), 108(3), . . . , 108(N) include the same number of blades, or that the blades are oriented in a same configuration. For example, the propellers for the motors 108(1), 108(2), 108(3), . . . , 108(N) may be designed using any propeller desymmetrization techniques, such as changing the spacing of blades (e.g., unequal degree of distribution of blades).

Figure 2:
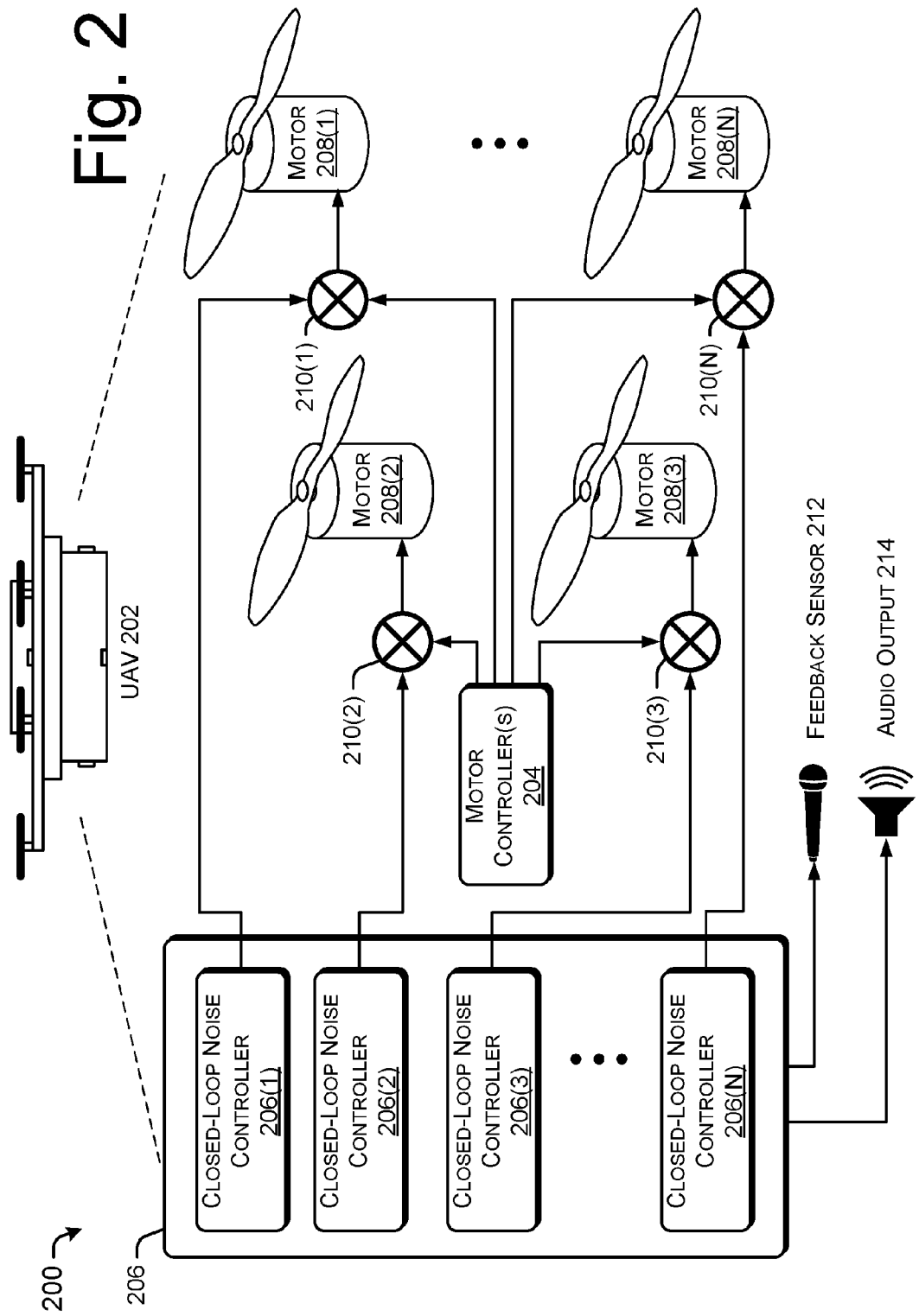
FIG. 2 is a schematic diagram showing a UAV with a closed-loop noise controller for noise abatement, in accordance with embodiments of the disclosure.

FIG. 2 is a schematic diagram 200 showing a UAV 202 with motor controller(s) 204 and closed-loop noise controller 206 (including closed-loop noise controllers 206(1), 206(2), 206(3), . . . , 206(N)) for noise abatement, in accordance with embodiments of the disclosure. Further, the UAV 202 may include motors 208(1), 208(2), 208(3), . . . , 208(N), summation blocks 210(1), 210(2), 210(3), . . . , 210(N), a feedback sensor 212, and an audio output 214.

In some embodiments, the motor controller(s) 204 may correspond with the motor controller(s) 104 in FIG. 1, or may provide similar functions as the motor controller(s) 104 in FIG. 1. That is to say, the motor controller(s) 204 may provide a baseline control of the motors 208(1), 208(2), 208(3), . . . , 208(N) (e.g., a baseline RPM, an intended RPM, or a motor RPM uncompensated for noise) so that the UAV 202 may perform a desired operation, such as ascending, descending, hovering, or transiting.

The closed-loop feedback controllers 206(1), 206(2), 206(3), . . . , 206(N) may receive feedback from the feedback sensor 212 and may generate an optimization signal that, together with the motor control provided by the motor controller(s) 204, may control the motors 208(1), 208(2), 208(3), . . . , 208(N). The closed-loop noise controllers 206(1), 206(2), 206(3), . . . , 206(N) and the motor controller(s) 204 are shown schematically as combining at summation 210(1), 210(2), 210(3), . . . , 210(N), respectively, but it may be understood in the context of this disclosure that the output of the closed-loop noise controllers 206(1), 206(2), 206(3), . . . , 206(N) may be applied to the motor controller(s) 204 in any manner.

In some embodiments, the closed-loop noise controller(s) 206 may apply control to the motors 208(1), 208(2), 208(3), . . . , 208(N) to increase or decrease the RPM of the motors in a random amount (either absolutely or relatively to the baseline control signal), as a sequence or pattern, or in response to feedback generated by the feedback sensor 212. For example, the feedback sensor 212 may include a microphone or any audio sensor that senses sound generated by the UAV 202 and provides the data to the closed-loop noise controller(s) 206. In response, or based in whole or in part on the feedback received from the feedback sensor 212, the closed-loop noise controllers 206(1), 206(2), 206(3), . . . , 206(N) may increase, decrease, adjust, or otherwise change the RPM of the motors 208(1), 208(2), 208(3), . . . , 208(N) to change the noise signature of the motors 208(1), 208(2), 208(3), . . . , 208(N) to reduce a tonal quality of the noise. For example, by increasing the RPM of motor 208(1) by 300 RPM higher than a baseline RPM, or 10 percent higher than a baseline RPM, while keeping the RPM of the motor 208(2) at the baseline RPM (e.g., 3,000 RPM), the motors 208(1) and 208(2) may produce different tonal qualities of noise. Therefore, the overall tonal quality of noise produced by the UAV 202 may be reduced, decreasing the "annoying" quality of the noise produced by the UAV 202.

The closed-loop noise controllers 206(1), 206(2), 206(3), . . . , 206(N) may further analyze the noise signature of the UAV 202 to determine the effect of any RPM variation made to the motors 208(1), 208(2), 208(3), . . . , 208(N) on the noise signature of the UAV 202, and may continuously alter the RPM of the motors 208(1), 208(2), 208(3), . . . , 208(N) to minimize the tonal qualities of the UAV 202 noise signature. For example, the closed-loop noise controllers 206(1), 206(2), 206(3), . . . , 206(N) may include an audio processing algorithm that determines a quantity, amplitude, or a magnitude of a tonal component of the UAV 202 noise signature, and may adjust the RPM of the motors 208(1), 208(2), 208(3), . . . , 208(N) to minimize the quantity or magnitude of the tonal component. In some embodiments, the closed-loop noise controllers 206(1), 206(2), 206(3), . . . , 206(N) may be optimized to reduce any aspects of the noise signature of the UAV 202, for example, loudness, harshness, rattling, roughness, etc. In some embodiments, a noise signature may be determined for each motor of the UAV 202 by providing a feedback sensor for each motor. The noise signature of the UAV 102 or 202 is discussed in more detail in connection with FIG. 3.

In some embodiments, the closed-loop noise controllers 206 may monitor feedback from the feedback sensor 212 (e.g., a noise signature of the UAV) and may randomly adjust the motor RPM of one or more of the motors 208(1), 208(2), 208(3), . . . , 208(N). After one or more of the motors is provided with an adjusted RPM, the closed-loop noise controllers 206 may again monitor the feedback from the feedback sensor 212 (e.g., a second or updated noise signature of the UAV) and determine if the random adjustment has reduced a tonal quality of a noise signature of the UAV. If the tonal quality of the noise signature has increased, the closed-loop noise controller 206 may again randomly adjust the same or one or more different one of the motors 208(1), 208(2), 208(3), . . . , 208(N), with the process repeating until a tonal quality of the noise signature reaches a local minimum (e.g., indicating an optimal condition of the noise signature of the UAV). In some embodiments, the feedback from the feedback sensor 212 may indicate that the tonal quality of a noise signature is below a threshold, and the closed-loop noise controllers(s) 206 may determine not to adjust the RPM of the motors 208(1), 208(2), 208(3), . . . , 208(N).

Audio output 214 may be used to generate broadband noise or tones to further shape the noise signature of the UAV 202. For example, the audio output 214 may include a speaker that may generate anti-noise to reduce the amplitude of the tonal noise produced by the UAV 202. In some embodiments, the audio output 214 may use beamforming techniques, holographic shaping, or tomahawk shaping, for example, to shape the noise signature of the UAV 202 as perceived by an observer.

Figure 3:
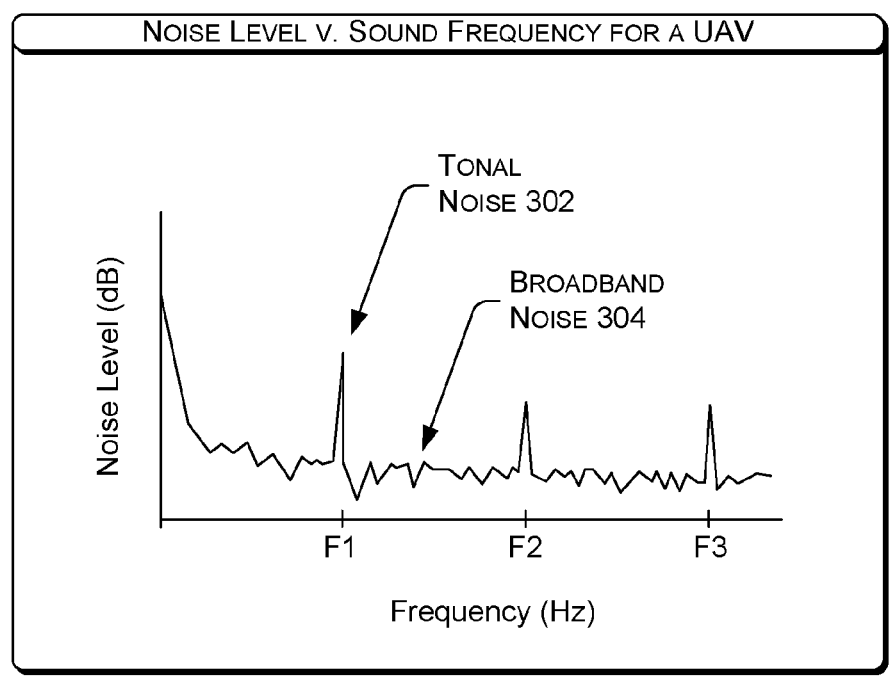
FIG. 3 is a graphic representation of noise level compared to sound frequency for a UAV.

FIG. 3 is a graphic representation 300 of a UAV noise level compared to sound frequency. For example, FIG. 3 includes a graph indicating a noise spectrum (i.e., a noise signature) of the noise level in decibels (dB) of the UAV for various frequencies F1, F2, and F3. In some embodiments, the graphic 300 represents the noise levels of the UAVs 102 or 202 in FIGS. 1 and 2. In some embodiments, the noise spectrum in FIG. 3 may represent at least the range of frequencies (in Hertz (Hz)) for the human hearing range (e.g., 20 Hz to 20,000 Hz).

Graphic 300 illustrates a tonal noise 302 and broadband noise 304. As discussed above, tonal noise in general is discrete frequency noise, and may be characterized by spectral tones that are pure tone in nature. Examples of tonal noise include the whistling of a water kettle at full boil, a tuning fork, or striking a single key on a piano. A broadband noise, on the other hand, is a complex mixture of sounds of different frequencies, with the mixtures often changing rapidly with time. Examples of broadband noise include the sound produced by a nearby waterfall, an ocean surf, or white noise (e.g., the sound of innumerable mice eating Rice Krispies (Medawar, 1977)).

Tonal noise is often perceived as more "annoying" than broadband noise, even if the two noises have the same noise level. The sounds of the UAV may be characterized by objective perceptual attributes (e.g., loudness, sharpness, roughness, fluctuation strength, and prominence) and may be measured using psychoacoustic functions to determine the qualities of a noise (i.e., unwanted sound) such as whether the noise is annoying, pleasant, boring, howling, roaring, rattling, etc. Examples of psychoacoustic functions for measuring and testing sound and noise include ISO 17.140.01 and ISO 17.140.30.

Graphic 300 illustrates a tonal noise at frequencies F1, F2, and F3. In the context of this disclosure, the tonal noise 302 at F1 may correspond to the blade passing frequency (BPF) of the UAV propeller, or may be cause by a rotor-stator interaction in the UAV motor. For example, if the UAV propeller with two blades rotates at 1200 RPM, the blade passing frequency may be at 40 Hz, and accordingly, a tonal noise may be generated at 40 Hz. Further, harmonics caused by the propeller may be created as tonal noises at frequencies F2 and F3. As may be understood in the context of this disclosure, a blade passing frequency (BPF) may be calculated by multiplying the rotation speed (in Hz) by the number of blades on a propeller. As may be further understood in the context of this disclosure, if multiple UAV motors, such as motors 108(1), 108(2), 108(3), . . . , 108(N) of FIG. 1, operate at the same RPM, the tonal noise 302 may arise as the summation (e.g., superposition) of the tonal noises generated by the motors 108(1), 108(2), 108(3), . . . , 108(N).

However, in accordance with embodiments of this disclosure, if the RPM of the motor 108(1) is different than the RPM of the motor 108(2), for example, the motors 108(1) and 108(2) will produce separate tonal noises that will "spread out" the tonal noise peak 302, thereby reducing an amplitude of the tonal components of the UAV noise signature by shifting the tonal noise to more of a broadband noise. That is to say, the noise generated by the UAV 102 or 202 will be perceived as "less annoying" when the motors 108(1), 108(2), 108(3), . . . , 108(N) or 208(1), 208(2), 208(3), . . . , 208(N) operate at different RPMs (e.g., when controlled by or operated in accordance with the RPM randomizers 106(1), 106(2), 106(3), . . . , 106(N), or the closed-loop noise controllers 206(1), 206(2), 206(3), . . . , 206(N), respectively).

Figure 4A:
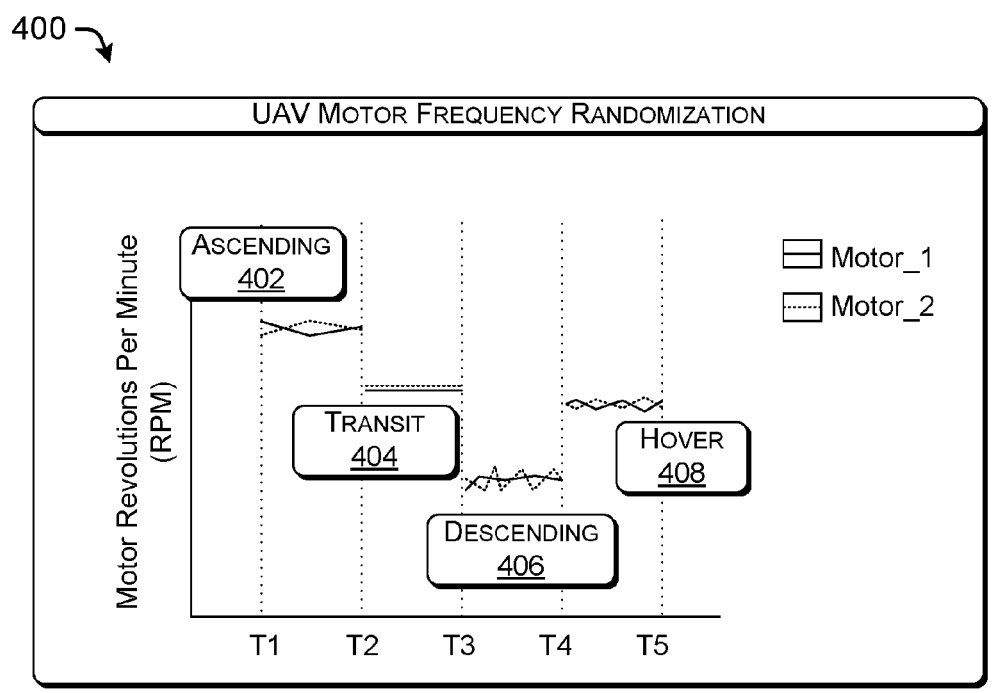
FIG. 4A is a graphic representation of motor frequency randomization illustrating motor RPM for various stages of flight, in accordance with embodiments of the disclosure.

FIG. 4A is a graphic representation 400 of motor frequency randomization illustrating motor revolutions per minute (RPM) for various stages of flight, in accordance with embodiments of the disclosure.

While FIG. 4A illustrates a motor RPM for Motor_1 and Motor_2, it may be understood in the context of this disclosure that a motor RPM may be provided for any number of motors, such as four, six, or eight. It may be understood that FIG. 4A shows a motor RPM for only two motors (rather than four, six, or eight) for simplicity and ease of illustration. In some embodiments, Motor_1 and Motor_2 may correspond to the motors 108(1), 108(2), 108(3), . . . , 108(N), or 208(1), 208(2), 208(3), . . . , 208(N) of FIGS. 1 and 2, respectively. The motor RPMs illustrated in graphic 400 for the flight stages of ascending 402, transit 404, descending 406, and hover 408, and the methods of producing the motor RPMs described in connection with FIG. 4, are meant to be illustrative, and it is understood in the context of this disclosure that the motor RPMs may differ from what is shown in graphic 400. Moreover, the exemplary flight stages of "ascending," "transit," "descending," and "hover" are meant to be descriptive and are not intended to limit the scope of the disclosure. It may be understood in the context of this disclosure that a UAV may include any number of flight stages or flight operations, and associated flight controls for maintaining the flight stage or flight operations.

Graphic 400 shows a RPM of Motor_1 and Motor_2 (e.g., generated by flight control signals) while the UAV is ascending 402 between times T1 and T2. As a non-limiting example, in this flight stage, the RPM of Motor_1 and Motor_2 may rise and fall as mirror images around a baseline motor RPM. In such an example, a RPM randomization value generated for Motor_1 may be added to the baseline motor RPM, while the same RPM randomization value may be subtracted from the baseline motor RPM for Motor_2. As a non-limiting example, a baseline RPM of a motor to ascend during the ascending 402 flight stage may be 1500 RPM, while the RPM randomization value may be 50 RPM. In this example, the RPM for Motor_1 would be 1550 RPM, while the RPM for Motor_2 may be 1450 RPM. As the RPM randomization value changes over time in the ascending 402 flight stage, as seen in graphic 400, the RPM of Motor_1 and Motor_2 change accordingly.

The transit 404 flight stage is represented in graphic 400 as the time period between times T2 and T3. In this flight stage, and as a non-limiting example, the RPM of Motor_1 and Motor_2 may be matched, may be the same, may be slightly offset, or may remain constant, without RPM randomization. That is to say, in some embodiments, the RPM randomization may not be applied to the motors when power resources are low or depleted, when cruising above a threshold altitude, when certain flight characteristics are desired (e.g., speed, efficiency, altitude, precision), or when UAV noise is not important (e.g., based on location such as over water, or in an unpopulated area (e.g., a rural area), or in an area with loud ambient noise (e.g., an industrial area)). More generally, the RPM randomization may or may not be applied depending on the flight stage or environmental characteristics.

The descending 406 flight stage is represented in graphic 400 as the time period between times T3 and T4. As a non-limiting example, in this flight stage, the RPMs of Motor_1 and Motor_2 may be independent and/or random. Additionally, the upper threshold speed and lower threshold speed (or the upper and lower bounds for deviation away from a baseline RPM) for the Motor_1 and Motor_2 may be the same or different in the descending 406 flight stage, and may be the same or different compared with other flight stages 402, 404, or 408. In some embodiments, the upper and/or lower thresholds for the RPM randomization may depend on the flight stage. For example, the thresholds may be larger during transit 404, for example, when larger variations in the motor RPMs may cause correspondingly large variations in the location or position of the UAV, or deviations away from an intended path, position, or course.

The hover 408 flight stage is represented in graphic 400 as the time period between times T4 and T5. As with the other flight stages, in this flight stage, the RPMs of Motor_1 and Motor_2 providing flight controls may be independent, random, patterned, sequential, dependent, or mirrored, for example. In some embodiments, the upper and lower thresholds for the RPM variations of the motors away from a baseline RPM value may be decreased during the hover 408, for example, to reduce any positional variations of the UAV. In some embodiments, the upper and lower thresholds for the RPM variations of the motors away from a baseline RPM value may be increased to provide more RPM variations to further alter the noise signature of the UAV.

Further, the relative motor RPMs for the flight stages 402, 404, 406, and 408 are illustrative only and are not intended to be limiting. For example, there may be an embodiment where the motor RPM during the hover 408 flight stage may be higher than the transit 404 stage, or the RPM during the descending 406 flight stage may be higher than the RPM during the ascending 402 flight stage (e.g., the UAV may use a maximum motor RPM to slow the descent of the UAV).

FIG. 4B is a graphic representation 410 of a flight path of the UAV, in accordance with embodiments of the disclosure. FIG. 4B illustrates an overhead (plan) view of a flight path of a UAV 412 traveling from an origination location 414 to a destination location 416. In various examples, the UAV 412 may correspond to the UAVs 102 and/or 202 in FIGS. 1 and 2. By way of example, the origination location 414 may be a fulfillment center where a package is loaded onto the UAV 412 for transit to a customer's house as the destination location 416. Also by way of example, the flight path 418 may represent an ideal flight path from the origination location 414 to the destination location 416. An actual flight path 420 (including flight segments 422, 424, and 426) is shown as the actual route taken by the UAV 412. Although the flight path 418 is shown as a straight line, this ideal flight path may include any number of course changes or variations to avoid obstacles or to avoid noise-sensitive locations, for example.

In some embodiments, applying the noise abatement techniques discussed herein may cause the position of UAV 412 to deviate slightly from the ideal flight path 418. Thus, as shown in FIG. 4B, the actual flight path 420 may deviate slightly from the ideal flight path 418. As may be understood in the context of this disclosure, the amount of allowable variance (e.g., a threshold) from the ideal flight path 418 may depend on a number of factors, including, but not limited to, a location of the UAV 412 (e.g., proximity to a noise-sensitive location), an altitude of the UAV 412, environmental factors (e.g., wind, time of day), a flight operation or flight stage (e.g., ascending, transiting, descending, hovering), flight controls associated with the flight operation or flight stage, UAV resources (e.g., a power supply), package weight, UAV speed, etc.

In some embodiments, the UAV 412 may determine to selectively operate the noise abatement techniques discussed herein. For example, the actual flight path 420 includes the flight segment 422 where the UAV 412 does not deviate, or deviates minimally, from the ideal flight path 418. Although the flight segment 422 is illustrated as occurring approximately in the middle portion of the flight path 418 between the origination location 414 and the destination location 416, it may be understood in the context of the disclosure that the noise abatement techniques may be selectively operated at any time.

In some embodiments, when the UAV 412 is determined to be outside or beyond a position threshold, a boundary threshold, or an intended course, the UAV 412 may operate to direct the UAV 412 to return to the intended course. For example, the UAV 412 may alternate, for example, between applying a noise abatement technique and correcting a position of the UAV 412. In some embodiments, if the UAV 412 is determined to be beyond a position threshold, a boundary threshold, or an intended course, the noise abatement algorithms may be scaled, modified, or adjusted to redirect the UAV 412 in direction towards the destination location 416.

Further, flight segments 424 and 426 illustrate that a rate of varying or changing motor RPMs may vary continuously, periodically, or at random intervals. For example, the motor RPMs of the UAV 412 may be varying at irregular intervals, which in turn lead to flight segments 424 and 426 having varying lengths, and/or may lead to irregular or random movements of the UAV, as illustrated in FIG. 4B. As a non-limiting example, the RPM randomizers 106(1), 106(2), 106(3), . . . , 106(N) and/or the closed-loop noise controllers 206(1), 206(2), 206(3), . . . , 206(N) may operate at varying frequencies or at irregular intervals. That is to say, the rate at which one of the RPM randomizers 106 or the closed-loop noise controllers 206 operates for an individual UAV motor may vary independently of other motors, and/or may operate at a random or irregular intervals. In some embodiments, the intervals between updating a motor RPM with a randomized input may vary according to a motor speed pattern or sequence.

Figure 5:
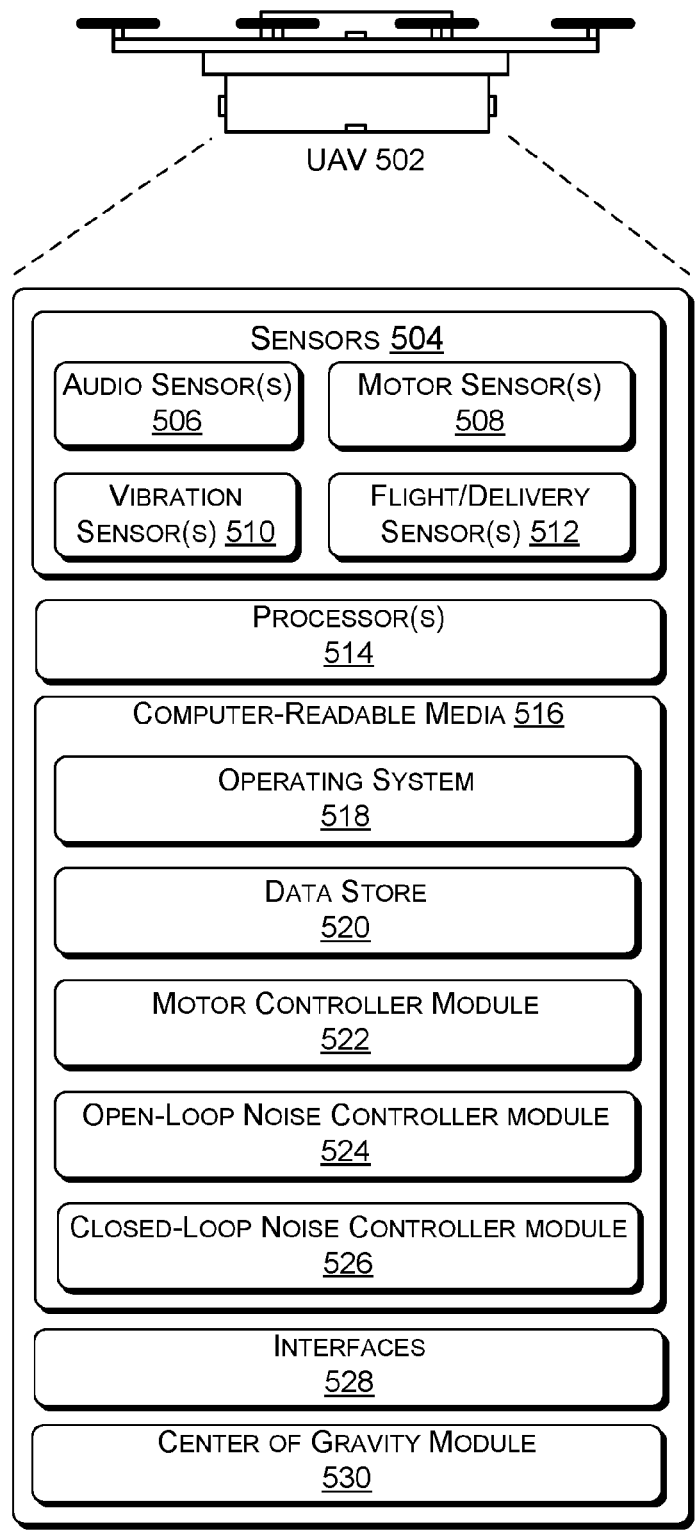
FIG. 5 is a block diagram of components of an example UAV including noise abatement components.

FIG. 5 illustrates an example UAV 502 in accordance with embodiments of the disclosure. In various examples, the UAV 502 may correspond to the UAVs 102, 202, and/or 412. The UAV 502 may be equipped with sensors 504 that provide feedback of the noise signature of the UAV 502, and that monitor the operation and functionality of the physical structures and the physical systems of the UAV 502. In some embodiments, the sensors 504 may correspond to the feedback sensor 212 of FIG. 2. The sensors 504 may include, but are not limited to, audio sensor(s) 506, motor sensor(s) 508, vibration sensor(s) 510, and flight/delivery sensor(s) 512.

In some embodiments, the audio sensor(s) 506 may be used to monitor a noise signature of the UAV 502. In some embodiments, the audio sensor(s) 506 may provide feedback to the closed-loop noise controller module 526. A microphone may measure or sense the noise produced by the UAV 502, including noise generated by the motors, propellers, and other systems of the UAV 502.

In some embodiments, the motor sensor(s) 508 may monitor or measure the status of some or all of the motors in the UAV 502. For example, the motor sensor(s) 508 may measure the RPM of each individual motor and compare the measured RPM to the intended RPM to determine if the motor is functioning correctly. In other examples, the motor sensor(s) 508 may monitor a temperature of a motor to detect any abnormal operating conditions. In some embodiments, the motor sensor(s) 508 may be used to determine a difference in RPMs between motors of the UAV 502.

In some embodiments, vibration sensor(s) 510 may monitor or measure the vibrations of the UAV 502. For example, vibrations sensors or strain gauges may be placed in, on, or around the motors or frame of the UAV 502 to detect the vibrations of the motor or frame of the UAV 502 to determine an amount of noise generated by the UAV 502. In some embodiments, a vibration profile for the UAV 502 may be generated and correlated with tonal noises and broadband noises. In some embodiments, the vibration sensor(s) 510 may include a system of lasers and mirrors placed around the UAV 502 to detect vibrations of the UAV 502. For example, the vibration sensor(s) 510 may include a charge-coupled device (CCD) or a complementary metal-oxide semiconductor (CMOS) image sensor to detect positional change of reflected laser light and determine vibrations associated with the UAV 502.

In some embodiments, the flight/delivery sensor(s) 512 may include sensors such as digital cameras, spectral cameras (e.g., infrared), LIDAR, RADAR, global positioning system (GPS) sensors, chemical sensors, accelerometers, magnetometers, gyroscopes, pressure sensors, temperature sensors, wind speed sensors, altimeters, UAV resource sensors (e.g., battery sensors), etc. In some embodiments, data from the flight/delivery sensor(s) 512 may be used in conjunction with the RPM randomizers, for example, in determining a flight stage and/or flight controls of the UAV 502. The flight/delivery sensor(s) 512 may also determine a position of the UAV 502, which may be used to determine if the UAV is in or out of position based on the RPM randomization of the motors. In some embodiments, the flight/delivery sensor(s) 512 may track the available resources or remaining resources of the UAV 502, such as battery levels or power levels, which may be used to determine whether the UAV 502 may apply the noise abatement operations as described herein.

In some embodiments, the UAV 502 may include one or more processor(s) 514 operably connected to computer-readable media 516. The UAV 502 may also include one or more interfaces 528 to enable communication between the UAV 502 and other networked devices, such as a central controller 602 (discussed in connection with FIG. 6) or other UAVs. The one or more interfaces 528 may include network interface controllers (NICs), I/O interfaces, or other types of transceiver devices to send and receive communications over a network. For simplicity, other computers are omitted from the illustrated UAV 502.

The computer-readable media 516 may include volatile memory (such as RAM), non-volatile memory, and/or non-removable memory, implemented in any method or technology for storage of information, such as computer-readable instructions, data structures, program modules, or other data. Some examples of storage media that may be included in the computer-readable media include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by a computing device.

In some embodiments, the computer-readable media 516 may include an operating system 518 and a data store 520. The data store 520 may be used to locally store sensor data that corresponds to the sensor 504 data. As non-limiting examples, the data store 520 may store noise-abatement algorithms, patterns, sequences, or randomization algorithms used to reduce the noise signature of the UAV 502.

In various examples, the computer-readable media 516 may include a motor controller module 522. The motor controller module 522 may correspond the motor controller(s) 104 of FIG. 1 or the motor controller(s) 204 of FIG. 2. In some embodiments, the motor controller module 522 may generate control signals to control the motors of the UAV, such as a motor duty cycle for each motor of the UAV, or a baseline RPM value for each motor of the UAV. The motor controller module 522 controls the motors in order to direct the UAV 502 to perform operations to deliver a package, such as ascending, descending, hovering, and transiting.

In various examples, the computer-readable media 516 may include an open-loop noise controller module 524. The open-loop noise controller module 524 may correspond to the RPM randomizers 106(1), 106(2), 106(3), . . . , 106(N) in FIG. 1. In some embodiments, the "open-loop" aspect of the open-loop noise controller module 524 may indicate that the open-loop noise controller module 524 does not receive audio feedback or vibration feedback indicating a noise signature of the UAV 502. In some embodiments, the open-loop noise controller 524 may receive data from the flight/delivery sensor(s) 512 to determine in which flight stage the UAV 502 is operating, or to determine if the UAV 502 is within a desired position based on the flight stage of the UAV 502. In some embodiments, the open-loop noise controller module 524 may set an absolute or relative RPM increase or decrease based on the baseline RPM provided by the motor controller module 522. In some embodiments, the open-loop noise controller module 524 may set an upper-bound and/or a lower-bound (i.e., a randomization threshold) independently for a RPM variation around the baseline RPM (i.e., an upper threshold speed and/or a lower threshold speed). In some embodiments, the upper-bound and/or lower-bound maybe be set independently for each motor of the UAV 502, or may be set depending on the flight stage, flight controls, available resources, location parameters, etc. of the UAV 502. In some embodiments, the open-loop noise controller 524 may use a predetermined pattern or sequence of adjusting the RPM of one or more motors that has been determined to optimize a noise signature of the UAV 502.

In various examples, the computer-readable media 516 may include a closed-loop noise controller module 526. In some embodiments, the closed-loop noise controller module 526 may receive feedback from the sensors 504 to reduce the tonal qualities of the noise signature of the UAV 504. In some embodiments, the closed-loop noise controller module 526 may correspond to the closed-loop noise controllers 206(1), 206(2), 206(3), . . . , 206(N) of FIG. 2. In some embodiments, the "closed-loop" aspect of the closed-loop noise controller module 526 may indicate that the closed-loop noise controller module 524 may receive audio feedback or vibration feedback indicating a noise signature of the UAV 502. As discussed above in connection with FIG. 3, the noise signature of the UAV 502 may include tonal noise and broadband noise reflecting propeller noise, motor noise, and noise from other systems of the UAV 502. The closed-loop controller 526 may receive an instantaneous, periodic, or continuous noise signature of the UAV 502 and may adjust the motor RPM variations for some or all of the motors of the UAV to reduce a tonal noise aspect, for example, of the noise signature of the UAV 502.

In some embodiments, the UAV 502 may also include a center of gravity module 530 to shift the center of gravity of the UAV 502 during a flight stage. For example, the UAV 502 may shift a dedicated weight, ballast, or component of the UAV 502 in any direction to destabilize the UAV 502 so that unequal RPMs may be used to drive the motors for the UAV 502. For example, the weight may be shifted to one side of the UAV 502 such that motors near the weight may operate at a higher RPM than motors further away from the weight on the UAV 502. In some embodiments, the weight may be shifted dynamically during a flight operation such as ascending, descending, hovering, or transiting. In some embodiments, the weight may set at a departure location of the UAV 502, based on a weight of a package to be delivered. In some embodiments, the weight to be shifted by the center of gravity module 530 may be a package or a payload of the UAV 502. The center of gravity module 530 is discussed in connection with FIGS. 6A and 6B, below.

Figure 6A:
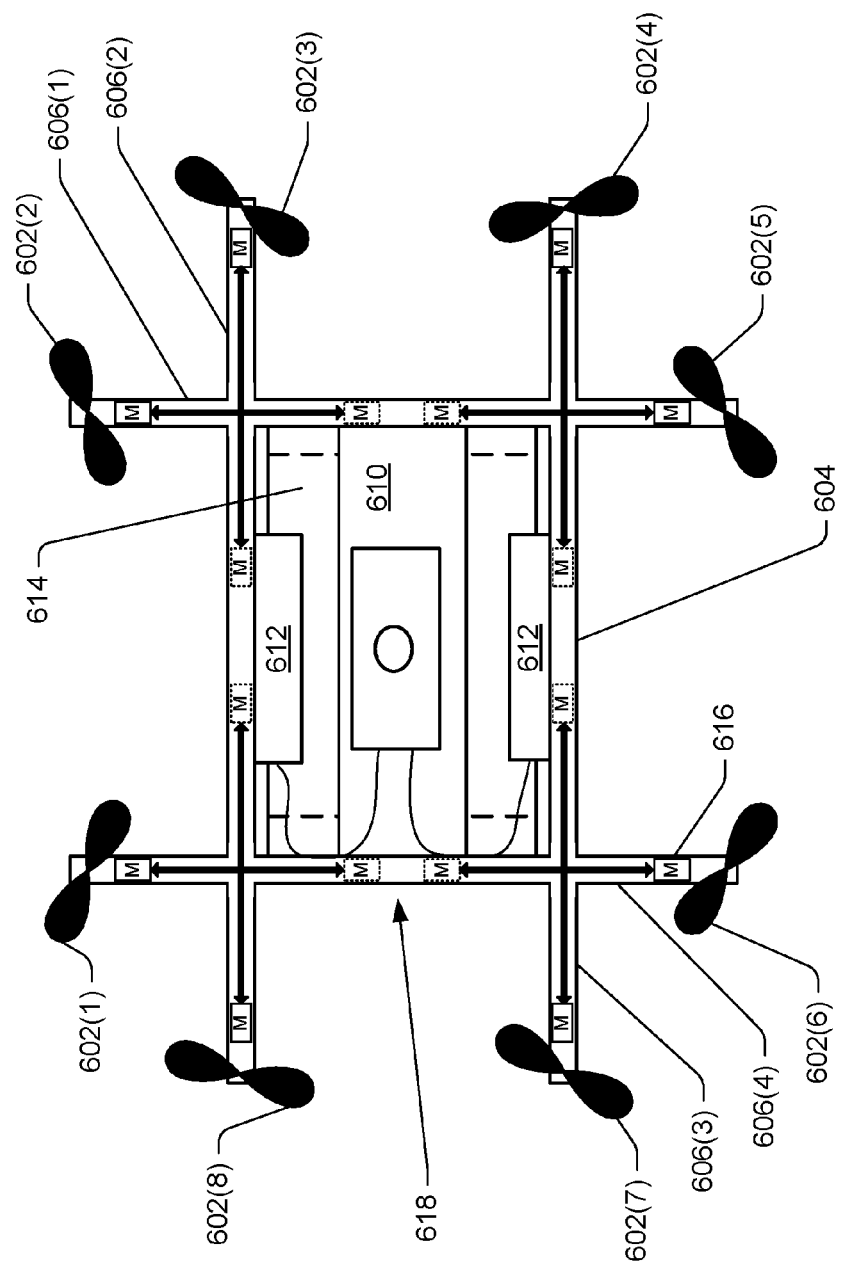
FIG. 6A is a top view of an illustrative UAV that includes movable ballast usable to modify flight and maneuverability characteristics of the UAV.

FIG. 6A is a top view of an illustrative UAV that reflects a center of gravity module 530 usable to modify flight, maneuverability, and center of gravity characteristics of the UAV 600. This functionality may be used to counteract changes to RPMs to individual motors and/or for other control reasons. For example, when the UAV is hovering and one motor is slowed (less RPMs) per the techniques described above, the device and features described with reference to FIG. 6A may enable moving weight in the UAV, such as away from the slowed motor, which may enable the UAV to maintain a desired control and/or location even with the change in motor RPM. As another example, the device and features described with reference to FIG. 6A may be enable moving weight in the UAV to destabilize the UAV, requiring updated flight controls to vary the RPMs of individual motors and return the UAV to an intended course, velocity, or heading.

As illustrated, the UAV 600 includes eight propellers 602(1), 602(2), 602(3), 602(4), 602(5), 602(6), 602(7), and 602(8) (also called rotors) spaced about a frame 604 of the UAV 600. The propellers 602 may be any form of propeller (e.g., graphite, carbon fiber) and of a size sufficient to lift the UAV 600 and any inventory/payload engaged by the UAV 600 so that the UAV 600 can navigate through the air, for example, to deliver an inventory item to a location/destination. While this example includes eight propellers, in other implementations, more or fewer propellers may be utilized. Likewise, in some implementations, the propellers may be positioned at different locations on the UAV 600. In addition, alternative methods of upward and/or forward propulsion may be utilized. For example, fans, jets, turbojets, turbo fans, jet engines, and the like may be used to propel the UAV.

The frame 604 or body of the UAV 600 may likewise be of any suitable material, such as graphite, carbon fiber, plastic, composite, and/or aluminum. In this example, the frame 604 of the UAV 600 includes four structures (or spars) 606(1), 606(2), 606(3), and 606(4) arranged in a hash pattern with the structures intersecting and joined at approximately perpendicular angles. However, more or fewer structures 606 may be included in the UAV, and may be arranged in any manner. Examples of various orientations are described in U.S. patent application Ser. No. 14/497,136, the entirety of which is herein incorporated by reference.

Mounted to the frame 604 is a UAV control system 610. In some embodiments, the control system 610 may include components discussed in FIG. 5, including the processor(s) 514, the computer-readable media 516, the operating system 518, the data store 520, the motor controller module 522, the open-loop noise controller module 524, the closed-loop noise controller module 526, the interfaces 528, and the center of gravity module 530. In this example, the UAV control system 610 is mounted centrally and on top of the frame 604. The UAV control system 610 controls the operation, routing, navigation, communication, center of gravity (ballast) movement, and the inventory engagement mechanism of the UAV 600.

Likewise, the UAV 600 includes one or more power modules 612. In this example, the UAV 600 includes two power modules 612 that are removably mounted to the frame 604. The power module for the UAV may be in the form of battery power, solar power, gas power, super capacitor, fuel cell, alternative power generation source, or a combination thereof. For example, the power modules 612 may each be a 6000 mAh lithium-ion polymer battery, polymer lithium ion (Li-poly, Li-Pol, LiPo, LIP, PLI or Lip) battery. The power module(s) 612 are coupled to and provide power for the UAV control system 610 and the propeller motors.

As mentioned above, the UAV 600 may also include an inventory engagement mechanism 614. The inventory engagement mechanism may be configured to engage and disengage items and/or containers that hold items. Further, the inventory engagement mechanism 614 may be configured to shift a payload within the UAV 600 to shift the center of gravity. In this example, the inventory engagement mechanism 614 is positioned within a cavity of the frame 604 that is formed by the intersections of the structures 606. The inventory engagement mechanism communicates with (via wired or wireless communication) and is controlled by the UAV control system 610.

Returning to the structures 606, at least some of the structures 606 may include or facilitate movement of ballast 616, also labeled "M" in FIG. 6A. The structures 606 may include ballast in a cavity formed by the structures when the structures are formed as tubes, U-shaped structures, etc. The ballast 616 may be moveable outside of a structure, but coupled to the structure, such as on rails, guides, or other coupling mechanisms. The ballast 616 may traverse between a first position and a second position along a structure to modify a distribution of weight about the frame 604. For illustrative purposes, the ballast 616 is shown in a first position using solid lines and a second position using dashed lines. In accordance with one or more embodiments, the ballast 616 may be moved to a centralized location 618 of the frame 604, such as proximate to or near the UAV control system 610, which may adjust a polar moment of inertia and may allow more agile operation, control, or maneuvering of the UAV 600. The ballast 616 may be moved outward from the centralized location of the UAV, which may adjust a polar moment of inertia and may allow more stable operation, control, or maneuvering of the UAV 600. Further, each of the ballast 616 may be adjusted independently of the other, such that the ballast 616 may be distributed asymmetrically throughout the UAV 600. In such an embodiment, the motors may operate at different RPMs to compensate for the uneven weight distribution. Additional details and embodiments of the ballast 616 and structures 606 are described in U.S. patent application Ser. No. 14/497,136, the entirety of which is herein incorporated by reference.

Figure 6B:
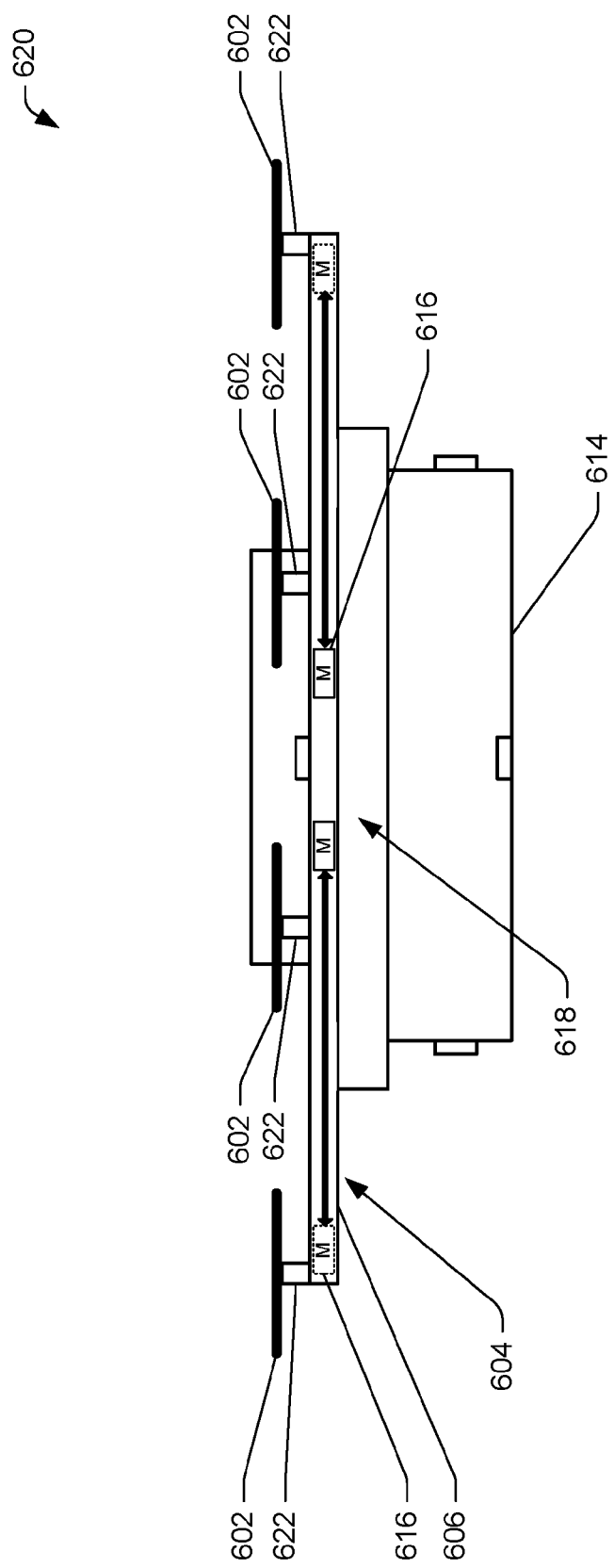
FIG. 6B is a side elevation view of the illustrative UAV shown in FIG. 6A.

FIG. 6B is a side elevation view of the illustrative UAV 600 shown in FIG. 6A. In the side view of the UAV 600 illustrated in FIG. 6A, four motors 622 and propellers 602 are visible. In other implementations, additional or fewer of the motors 622 and/or the propellers 602 may be included in the UAV 620. In this example, the motors 622 may all be mounted at 90 degrees with respect to the UAV 620. In some embodiments, the mountings of the motors may be adjustable such as to enable use of at least some of the propellers 602 to create forward propulsion during forward flight. Although the ballast 616 is shown as moving along two axes in FIGS. 6A and 6B, the ballast 616 may traverse along any direction to enable adjustment of the center of gravity in accordance with the noise abatement techniques described herein.

Figure 7:
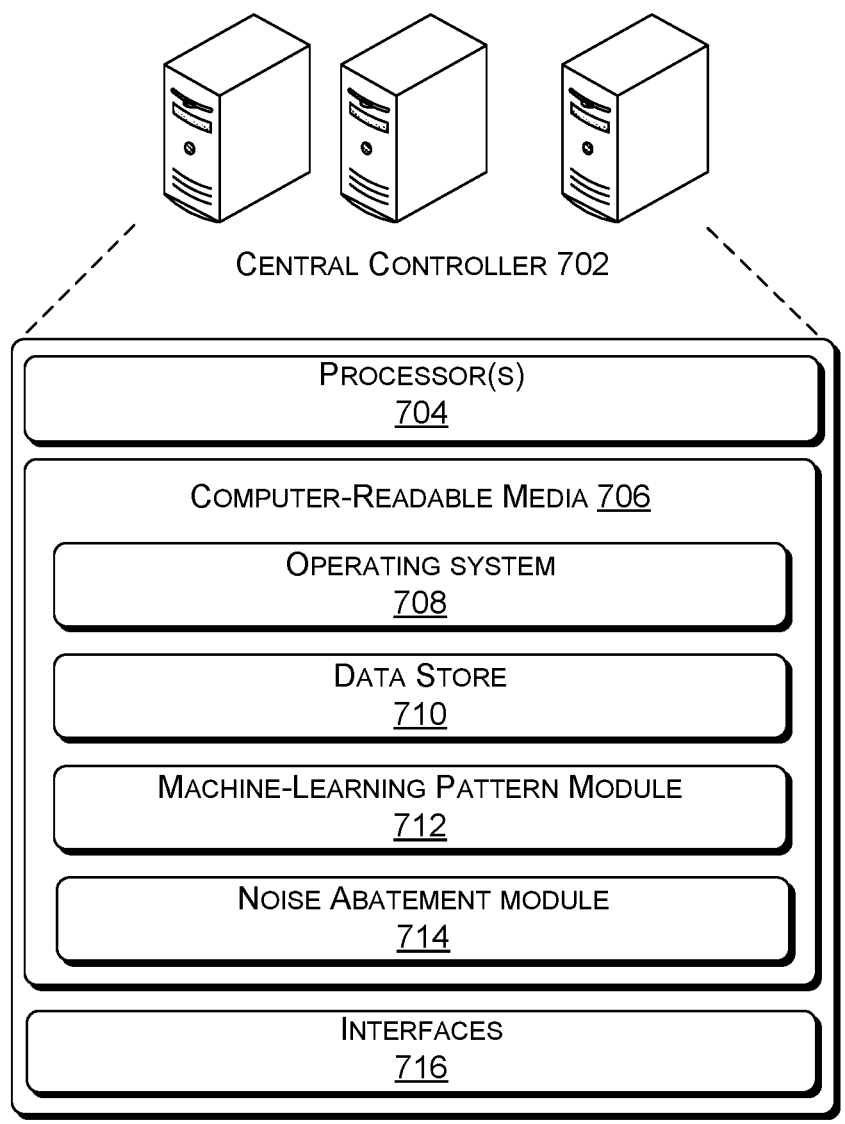
FIG. 7 is a block diagram of an exemplary system for generating noise abatement algorithms.

FIG. 7 illustrates an example central controller 702. In various examples, the central controller 702 may generate, develop, and/or provide aspects of the noise abatement apparatuses, systems, algorithms, and/or operations described in this disclosure. The central controller 702 may include one or more processor(s) 704 that interact with a computer-readable media 706. The computer-readable media 706 may include an operating system 708 and a data store 710 to store data to be sent to or received from a UAV. In various embodiments, the data store 710 may store data to be transmitted to or received from the UAVs 102, 202, 412, 502, 600, or 620. The computer-readable media 706 may also include software programs or other executable modules that may executed by the one or more processor(s) 704. Examples of such programs or modules include, but are not limited to, machine-learning pattern modules, noise abatement modules, sensor algorithms, data analysis algorithms, network connection software, and control modules.

Various instructions, methods, and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processing unit, as hardware, and/or as firmware. Typically, the functionality of the program modules may be combined or distributed as desired in various embodiments. An implementation of these modules and techniques may be stored on or transmitted across some form of computer-readable media.

In various embodiments, the computer-readable media 706 may include a machine-learning pattern module 712. In various examples, the machine-learning pattern module 712 may generate a pattern or sequence to be used by a UAV to adjust motor RPM and cause noise abatement. For example, the machine-learning pattern module 712 may operate at a central location for testing UAVs. The UAVs may conduct a variety of flight operation such as ascending, descending, hovering, and transiting, and the machine-learning pattern module 712 may measure the noise signature of the UAV during various operations. During the flight operations, the machine-learning pattern module 712 may vary the RPM of one or more motors of the UAV and measure the noise variations of the UAV. Subsequently, the machine-learning pattern module 712 may determine the psychoacoustic metrics of the noise signatures, and may correlate the less "annoying" noise signatures with the UAV parameters such as a pattern or sequence of varying the motor RPM, upper-bounds and lower-bounds of RPM variations away from a baseline RPM, or positional deviations away from a desired position.

In some embodiments, a motor speed pattern or sequence may be generated to optimize the motor RPM variations to reduce a tonal noise component of the UAV. As a non-limiting example for two motors of a four-motor UAV, a motor speed pattern or sequence is described herein. First, the pattern or sequence may include operating a first and second motor at a baseline RPM and injecting a random RPM variation into the motor speed of the second motor. The motors speeds of the first motor and the second motor may be held for a predetermined time, and then the motor speed the second motor may be returned to the same or a new baseline RPM, while a random RPM variation may be injected into the motor speed of the first motor. It may be understood in the context of this disclosure that there are innumerable patterns or sequences available to randomize the RPMs of the motors of the UAV, which may be determined by the machine-learning pattern module 712 of the central controller 702.

In various embodiments, the computer-readable media 706 may include a noise abatement module 714. In various examples, the noise abatement module 714 may provide RPM randomization parameters to the UAVs to be used in a flight operation. In some embodiments, the RPM randomization operations provided by the RPM randomizers 106(1), 106(2), 106(3), . . . , 106(N), or the open-loop or closed-loop control provided by the UAVs 102, 202, 412, 502, 600, or 620 may be provided by the noise abatement module 714. That is to say, in some embodiments, processes performed by the UAV 102, 202, 412, 502, 600, or 620, or control performed by various components of the UAV 102, 202, 412, 502, 600, or 620, may be performed by the central controller 702, the UAV 102, 202, 412, 502, 600, or 620, or both.

In various embodiments, the central controller 702 may include one or more communication interfaces 716 for exchanging messages with a UAV, various user devices, and other networked devices. The communication interfaces 716 can include one or more network interface controllers (NICs), I/O interfaces, or other types of transceiver devices to send and receive communications over a network. For simplicity, other components are omitted from the illustrated device. In at least one embodiment, the communication interfaces 716 receive sensor data, including a noise signature, from the UAV.

Figure 8:
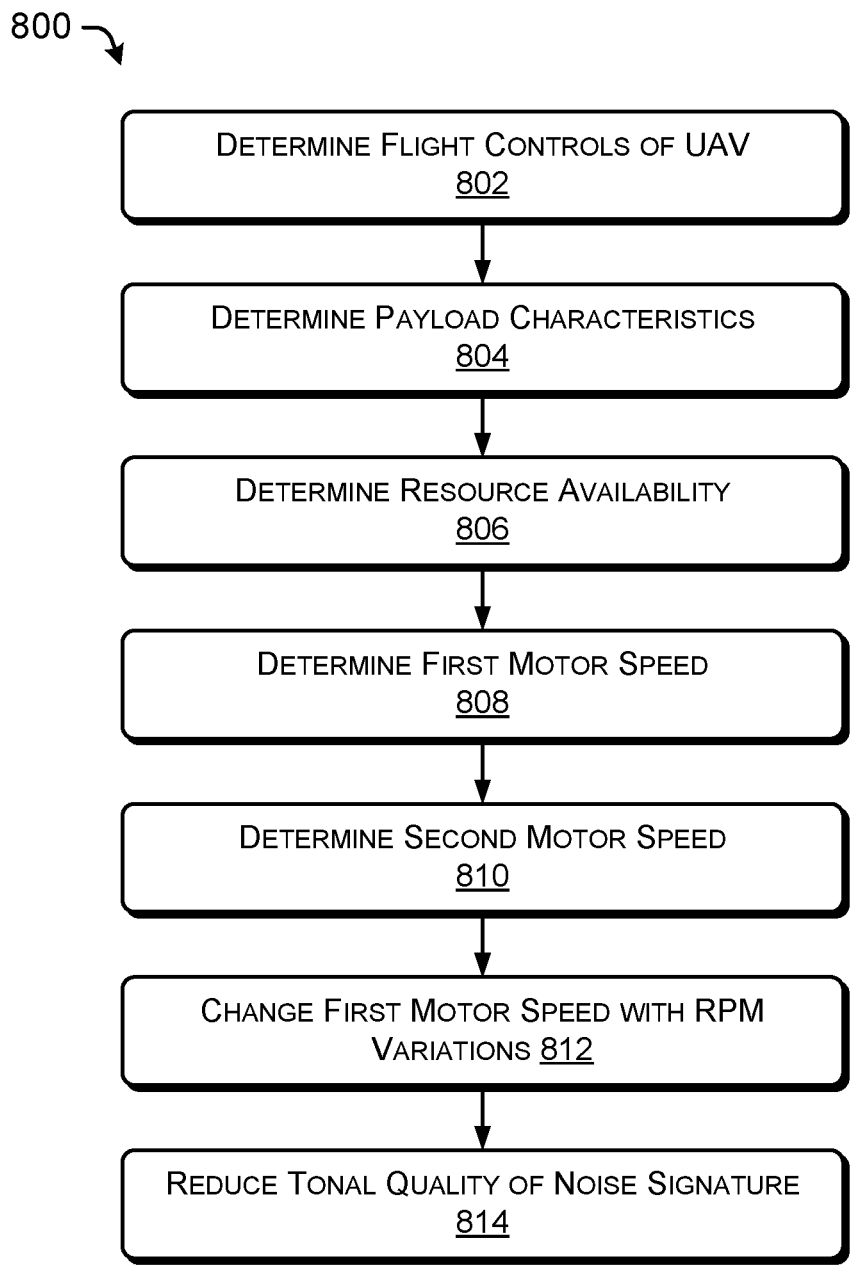
FIG. 8 is a flow diagram of an example process for UAV motor RPM randomization, in accordance with embodiments of the disclosure.

FIG. 8 is a flow diagram of an example process 800 for UAV motor RPM randomization, in accordance with embodiments of the disclosure. In some embodiments, the process 800 may be performed by the central controller 702, the UAV 102, 202, 412, 502, 600, or 620, or both. Some of the operations in the process 800 may be performed in parallel or possibly in a different order than the order shown in FIG. 8.

At 802, flight controls and/or a flight stage are determined for the UAV. For example, the UAV may be ascending, descending, hovering, or transiting, with various flight controls (e.g., position, heading, velocity) associated with the flight operations. In some embodiments, determining flight controls and/or a flight stage includes determining a baseline RPM for one or all of the motors of the UAV to perform the current flight stage, or to transition to an intended flight stage, and may include determining a position, velocity, altitude, direction, heading, location of the UAV, or an intended course of the UAV. In some embodiments, determining flight controls and/or a flight stage includes bypassing the noise abatement operations.

At 804, characteristics of a payload of the UAV are determined. In some embodiments, the payload corresponds to a package to be delivered by the UAV to a customer. In some embodiments, the characteristics of a payload include physical dimensions such as weight, length, width, height, stiffness, etc., or an aerodynamic profile. For example, the payload characteristics may be inputs to the noise abatement algorithms. In some embodiments, the weight and/or size of the payload may affect the center of gravity of the UAV, which may affect the RPM randomization parameters to be used to vary the RPM of the motors of the UAV. For example, an upper-bound for an RPM variation may be higher in the case of a payload that is heavy, or when a payload is present (e.g., before delivery of the payload), because the UAV may have more inertia, and RPM variation may have less effect of a position of the UAV compared to a case where the payload is light, or when the payload is not present (e.g., after delivery).

At 806, resource availability is determined for the UAV. In some embodiments, the resource availability may correspond to a power level such as a battery level, or a time resource of the UAV. For example, it may be the case that implementing a noise abatement process may decrease a flight efficiency of the UAV. Accordingly, if the battery level of the UAV is below a threshold level, or more generally, if a power level in a power supply is below a threshold level, the UAV may not implement the noise abatement process. In some embodiments, a remaining distance for the UAV to travel is compared to the battery level of the UAV to determine if the UAV will have enough resources to implement the noise abatement processes and perform the flight operations of the UAV. In some embodiments, the UAV may have a time restriction, such a deadline to arrive at a destination. It may be the case that a UAV implementing a noise abatement processes may not travel as rapidly as a UAV not implementing the noise abatement processes, and thus, the resource availability may be considered in whether to perform the noise abatement operations.

At 808, the first motor speed is determined. In some embodiments, the first motor speed of the UAV depends on the flight stage or flight controls determined in operation 802. For example, determining the first motor speed may include determining a baseline RPM of the motor to perform an operation of ascending, descending, hovering, or transiting. Further, determining the first motor speed may include the baseline RPM to maneuver within the flight stage, and the first motor speed may change continuously based on sensor data received from the flight/delivery sensor(s) 512 of FIG. 5.

At 810, a second motor speed is determined. In some embodiments, the operations 810 may include similar operations as operation 808 but directed to the second motor. In some embodiments, operation 810 may include a determination that the first and second motors are within a threshold motor speed (i.e., the motor RPMs are within an absolute or relative amount). In some embodiments, if the first motor and the second motor are operating beyond a threshold motor speed (e.g., more than 1000 RPMs apart, or a difference in RPMs of more than 50 percent), the RPM randomizations may not be applied to the first or second motors. However, in some embodiments, if one of the first motor speeds or the second motor speeds is such that it may produce tonal harmonics that correspond to another motor, then the RPM randomizations may still be applied to the first or second motors. It may be understood in the context of this disclosure that the threshold motor speeds or values may be set at any speed or value, and the numbers discussed herein are for illustrative purposes.

Further, although process 800 refers to the first motor speed and the second motor speed, it may be understood in the context of this disclosure that the process 800 may include operations for any number of motors for the UAV. For example, the UAV may include four, six, or eight motors, and the noise abatement operations may be implemented to abate noise for some or all of the motors in the UAV.

At 812, the first motor speed is changed with RPM variations, such as by RPM randomizations. In some embodiments, the first motor speed is changed in accordance with the RPM randomizers 106(1), 106(2), 106(3), . . . , 106(N) described in connection with FIG. 1, the closed-loop noise controllers 206(1), 206(2), 206(3), . . . , 206(N) described in connection with FIG. 2, the open-loop noise controller module 524 or the closed-loop noise controller module 526 described in connection with FIG. 5, or the various flight stages and flight controls as described in connection with FIG. 4A or 4B. As discussed throughout this disclosure, the first motor speed may be changed with RPM variations in a variety of ways. For example, RPM variations may be random variations (either absolute or relative to a baseline RPM), or may be variations within an upper-bound (e.g., an upper threshold speed or RPM) and a lower-bound (e.g., a lower threshold speed or RPM), whereby the baseline RPM is determined based in part on the flight stage or flight controls of the UAV (e.g., in operation 802). In some embodiments, the lower-bound and upper-bound of the RPM variations may be referred to as a randomization threshold. The first motor speed may be changed according to a pattern or sequence of RPM variations injected into the motor signal of the control signal for the first motor of the UAV. In some embodiments, the pattern or sequence of RPM variations may be the result of a machine-learning pattern module 712 of the central controller 702, as described in connection with FIG. 7. In some embodiments, the pattern or sequence of RPM variations may cause the UAV to spin, rotate, or trace a circle or other pattern within a position threshold or a boundary threshold.

In some embodiments, the RPM variations are determined, and the motor speeds are changed for some or all of the motors of the UAV independently, while in some embodiments, the RPM variations (and motor speeds) may be changed with some degree of interdependence between the motors of the UAV. For example, in some embodiments, the RPM variations for the motors may be monitored to ensure that the motor speeds are not within a threshold RPM value (e.g., that the motor speeds differ by minimum threshold of 50 RPM). In some embodiments, the motor speeds for a first and second motor may be mirrored across a baseline RPM, whereby the baseline RPM depends in part on the flight stage or flight controls of the UAV. In some embodiments, a RPM variation may be randomly applied to a first motor, while the RPMs of one or more other motors may be adjusted to compensate for any positional deviations of the UAV.

At 814, a tonal quality of a noise signature of the UAV is reduced. As described above in connection with FIG. 3, the noise signature of the UAV may include tonal noise and broadband noise, with tonal noise being considered to be "more annoying" than broadband noise. In some embodiments, the tonal quality of the noise signature of the UAV may be reduced by changing the motor RPMs for the UAV motors to create differences in the RPMs of at least two motors. As a result, the tonal noises produced by each individual UAV motor may correspond to different frequencies, such that the amplitude of the tonal signature is reduced, and/or the overall tonal signature of the UAV may be spread over a wider range of frequencies.

Figure 9:
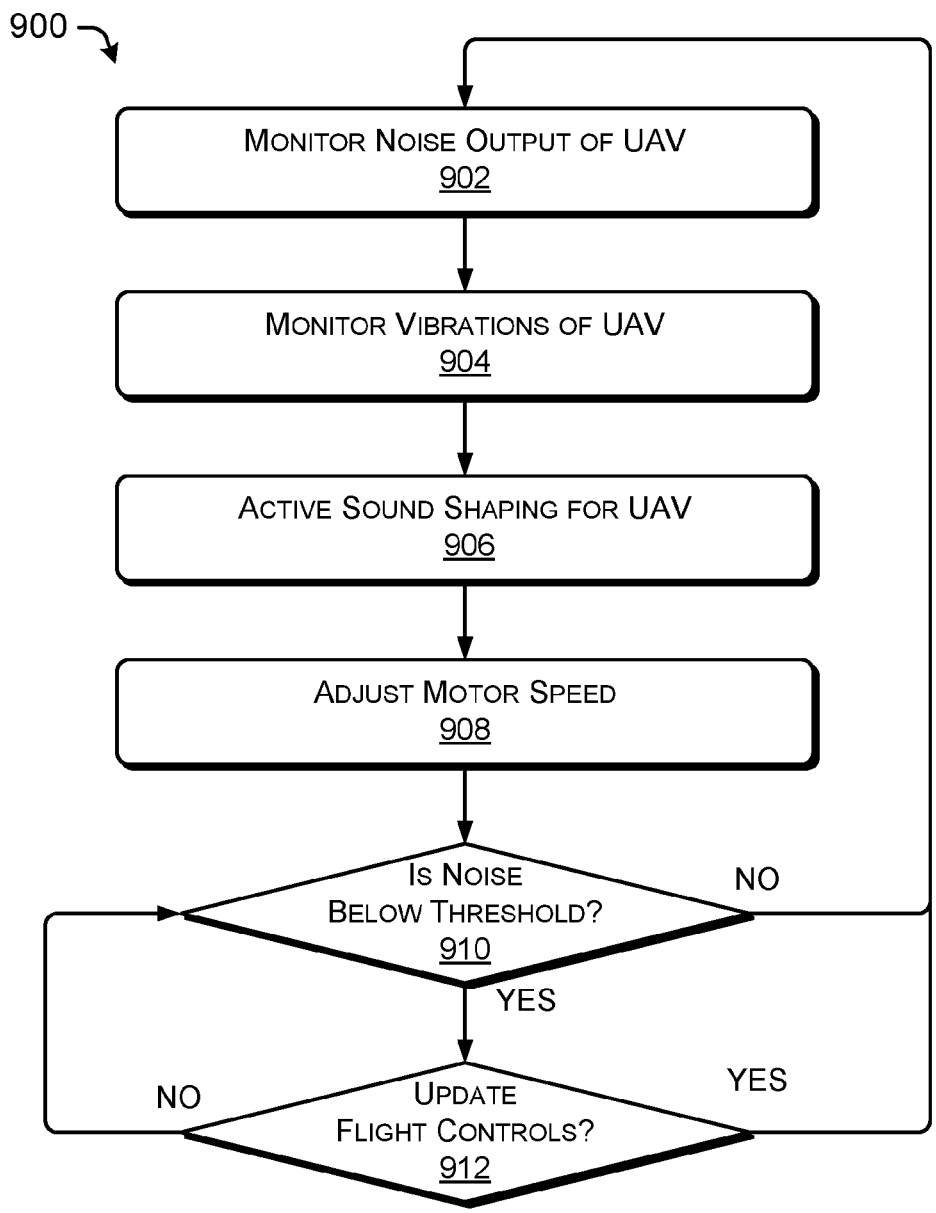
FIG. 9 is a flow diagram of an example process for UAV motor RPM randomization, in accordance with embodiments of the disclosure.

FIG. 9 is a flow diagram of an example process 900 for UAV motor RPM randomization, in accordance with embodiments of the disclosure. In some embodiments, the process 900 may be performed by the central controller 702, the UAV 102, 202, 412, 502, 600, or 620, or both. Some of the operations in the process 900 may be performed in parallel or possibly in a different order than the order shown in FIG. 9. In some embodiments, the operations in FIG. 9 may be performed in addition to, or instead of, the operations in FIG. 8.

At 902, the noise output of the UAV may be monitored. For example, the feedback sensor 212 or audio sensor(s) 506 may monitor or measure the sound produced by the UAV, from which the tonal noise and broadband noise components may be determined. As may be understood in the context of this disclosure, the amount of tonal noise may be quantified using psychoacoustic functions to determine the amplitude or characteristics of the tonal noise components, such as the tonal noise created by a propeller and motor operating at a blade passing frequency. In some embodiments, the noise output of the UAV is monitored to determine the overall noise output produced by the UAV. In some embodiments, multiple sensors may be used to determine noise signatures at multiple points on the UAV (e.g., at a first motor and a second motor), which may provide more direct information (i.e., better resolution) regarding the noise signature of each individual motor. In some embodiments, operation 902 is performed continuously or periodically, and in some embodiments, operation 902 may be performed in response to entering a flight stage, dropping below an altitude or speed threshold, entering within a threshold distance of a delivery location, etc.

At 904, vibrations of the UAV may be monitored. For example, the feedback sensor 212 or vibration sensor(s) 510 may monitor or measure the vibrations of the UAV, from which the tonal noise and broadband noise components may be determined. Operation 904 may be performed by vibration sensors, strain gauges, or using laser and mirror movement systems, as described in this disclosure.

At 906, active sound shaping may be used to alter the noise signature of the UAV. For example, as discussed in connection with FIG. 2, the audio output 214 may be used to generate noise or anti-noise to shape or cancel sound waves associated with the tonal qualities of the UAV. In some embodiments, operation 906 may include shaping the noise signature of the UAV to reflect that of a diesel truck. That is to say, operation 906 may include making the UAV sound like a diesel truck, or any other operation or object. In some embodiments, audio signals may be injected or input to a motor of the UAV so as to invoke vibrations of the motors to shape the noise signature of the UAV.

At 908, the motor speed is adjusted. In some embodiments, operation 908 may correspond to the operation 812 in FIG. 8 or in accordance with descriptions throughout this disclosure. In some embodiments, the motor speed may be increased or decreased by random or pseudo-random amounts from a baseline RPM value, for any period of time. In some embodiments, the motor speed may be changed for some or all of the motors of the UAV by injecting or introducing RPM variations into the motor control for the UAV, thereby reducing the tonal noise of the UAV. In some embodiments, the RPM variation applied to the motor is known to reduce a tonal component of the noise signature of the UAV.

At 910, it is determined whether the noise generated by the UAV is below a threshold. For example, the noise signature of the UAV following the motor speed adjustment may be monitored and the tonal noise and broadband noise components may be analyzed to determine if the tonal noise is below a threshold level. In some embodiments, the threshold for noise levels (e.g., tonal noise) may depend on a flight stage of the UAV, a proximity to a noise-sensitive location, an altitude of the UAV, environmental factors, etc. If the noise of the UAV is above a threshold, the operations may adjust the motor speeds again. In some embodiments, this decision at 910, coupled with the monitoring in operations 902 and/or 904, may provide the feedback mechanism for the closed-loop noise abatement operations.

At 912, it is determined whether to update flight controls. For example, the position, velocity, direction, heading, altitude, etc. of the UAV may be changing, and/or the UAV may determine that a course change must be conducted to change the flight operation or flight stage of the UAV. Accordingly, the operations may return to operation 902, and the operations may repeat to provide feedback to provide noise abatement to effect a change in the UAV operations. On the other hand, the UAV may operate with the current flight controls. In such a case, the operations may continue to operation 910, where the process may determine whether the noise is below a threshold, as discussed above. In some embodiments, flight controls may need to be updated continuously or periodically, depending on the flight stage, altitude, velocity, position, proximity to external objects, course change, etc. of the UAV.

Figure 10:
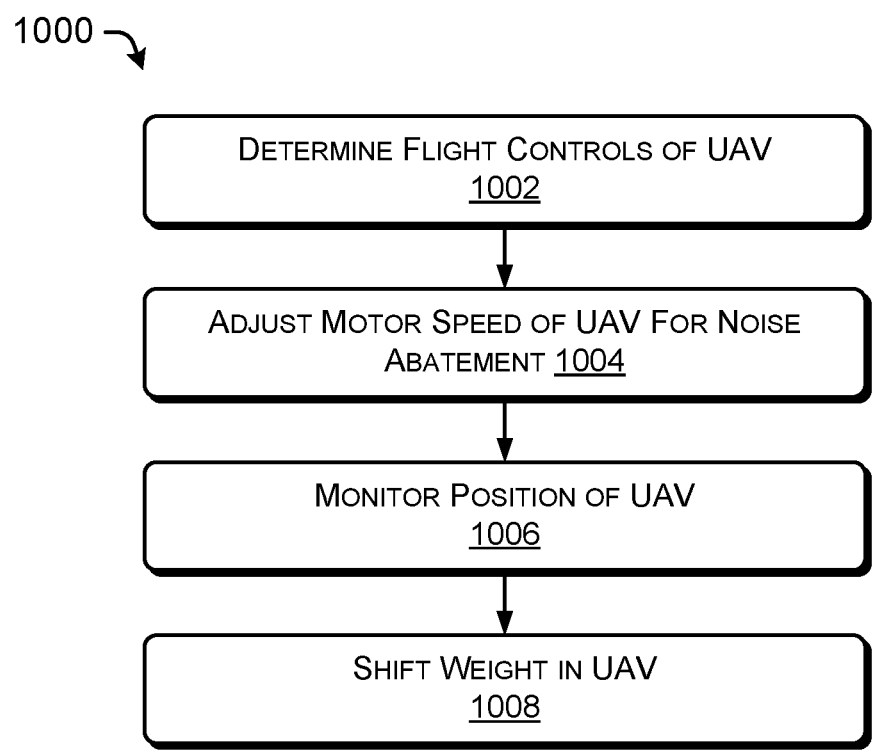
FIG. 10 is a flow diagram of an example process for adjusting a UAV center of gravity, in accordance with embodiments of the disclosure.

FIG. 10 is a flow diagram of an example process 1000 for controlling a UAV center of gravity, in accordance with embodiments of the disclosure. The center of gravity of the UAV may be performed in conjunction with the operations discussed above in FIGS. 8 and 9.

At 1002, flight controls and/or a flight stage are determined for the UAV. In some embodiments, the operations at 1002 may correspond with the operation 802 of FIG. 8. For example, the flight stage of the UAV may be ascending, descending, hovering, or transiting, with various flight controls (e.g., position, heading, velocity) associated with the flight operations. In some embodiments, determining flight controls and/or a flight stage includes determining a baseline RPM for one or all of the motors of the UAV to perform the current flight stage, or to transition to an intended flight stage, and may include determining a position, velocity, altitude, direction, heading, location of the UAV, or an intended course of the UAV. In some embodiments, determining flight controls and/or a flight stage includes bypassing the noise abatement operations.

At 1004, a motor speed of the UAV is adjusted to provide noise abatement in accordance with the techniques described herein. For example, the RPMs of individual motors of the UAV may be randomized using open-loop control or closed-loop control to reduce a tonal quality of noise produced by the UAV to provide noise abatement. However, as may be understood in the context of this disclosure, changing motor RPMs may vary the heading, location, velocity, etc. of the UAV.

At 1006, the position, heading, velocity, etc. of the UAV is monitored. After the motor speed (e.g., RPMs) are adjusted in operation 1004, the UAV may deviate from an intended course or position, or may move beyond a threshold boundary.

At 1008, weight(s) or ballast may be shifted in the UAV. In some embodiments, and as described above in connection with FIGS. 6A and 6B, the weight may be components integral to the UAV to change a center of gravity of the UAV. In some embodiments the weight may be shifted to compensate for the changes to the motor RPMs enacted in operation 1004. For example, a weight or ballast may be moved away a motor that has been slowed (e.g., lowered RPMs) from its baseline RPM, or the weight or ballast may be moved towards a motor that has been sped up (e.g., higher RPMs) with respect to its baseline RPM. Thus, by shifting the weight or ballast in the UAV in response to a change in motor RPM, the weights may counteract any control issues associated with the UAV.

As may be understood in the context of this disclosure, the order of operations 1004 and 1008 may be reversed, with the weight or ballast being shifted to destabilize the UAV, while the motor RPMs may be adjusted to compensate for the center of gravity destabilization. That is to say, shifting a weight or ballast in the UAV may alter the center of gravity of the UAV and may cause the UAV to go off-course or beyond a position threshold. Accordingly, the UAV may vary the speed of one or more motors to compensate for the shift, which may reduce a tonal noise component of the noise signature generated by the UAV.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A processor-implemented method comprising:
    determining a flight control of an unmanned aerial vehicle (UAV), the flight control of the UAV including at least a heading and a velocity of the UAV;
    setting a first motor speed of a first motor of the UAV, wherein the first motor speed is based in part on the flight control of the UAV;
    generating a first random value within a randomization threshold, the randomization threshold being an allowable deviation from the flight control of the UAV;
    determining a randomized motor speed based at least in part by applying the first random value to the first motor speed; and
    driving the first motor of the UAV at the randomized motor speed.

2. The processor-implemented method of claim 1, wherein applying the first random value to the first motor speed includes increasing or decreasing the first motor speed by the first random value.

3. The processor-implemented method of claim 1, further comprising:
    determining that the first motor speed and at least a second motor speed of at least a second motor of the UAV are approximately a same motor speed or are within a threshold speed variance; and
    changing at least the second motor speed to an adjusted second motor speed based in part on the determining that the first motor speed and at least the second motor speed are approximately the same motor speed or are within the threshold speed variance.

4. The processor-implemented method of claim 1, further comprising:
    decreasing the first motor speed by the first random value;
    generating a second random value within the randomization threshold; and
    increasing at least a second motor speed for at least a second motor of the UAV by the second random value.

5. The processor-implemented method of claim 1, further comprising shifting a weight or a ballast in the UAV based at least in part on a difference between the first motor speed and the randomized motor speed.

6. The processor-implemented method of claim 1, further comprising determining that a remaining power resource of the UAV is above a remaining power resource threshold.

7. The processor-implemented method of claim 1, wherein the driving the first motor at the randomized motor speed occurs during a first time period, and further comprising:
    determining an updated motor speed based on a new flight control; and
    driving the first motor of the UAV at the updated motor speed during a second time period.

8. The processor-implemented method of claim 7, wherein the second time period is a random amount of time after the first time period.

9. The processor-implemented method of claim 1, further comprising determining a payload characteristic of the UAV, wherein the randomization threshold is based in part on the payload characteristic of the UAV.

10. The processor-implemented method of claim 1, further comprising determining that the UAV is operating in a noise-sensitive location prior to the driving the first motor of the UAV at the randomized motor speed.

11. An unmanned aerial vehicle (UAV) comprising:
    one or more processors; and
    memory coupled to the one or more processors, the memory including one or more modules that are executable by the one or more processors to perform operations comprising:
        determining a flight control of the UAV, the flight control of the UAV including at least a heading and a velocity of the UAV;
        setting a first motor speed of a first motor of the UAV, wherein the first motor speed is based in part on the flight control of the UAV;
        generating a first random value within a randomization threshold, the randomization threshold based in part on the flight control of the UAV;
        determining a randomized motor speed by applying the first random value to the first motor speed; and
        causing the first motor of the UAV to operate at the randomized motor speed.

12. The UAV of claim 11, wherein applying the first random value to the first motor speed includes increasing or decreasing the first motor speed by the first random value.

13. The UAV of claim 11, wherein driving the first motor at the randomized motor speed is performed for a predetermined time period; and
    wherein the operations further comprise:
        determining an updated motor speed based on a new flight control; and
        applying the updated motor speed to the first motor of the UAV after the predetermined time period.

14. The UAV of claim 11, wherein the determining the randomized motor speed includes applying a motor speed pattern designed to reduce a tonal quality of a noise signature of the UAV.

15. The UAV of claim 11, wherein the operations further comprise determining that the UAV is operating in a noise-sensitive location.

16. An unmanned aerial vehicle (UAV) comprising:
    one or more processors; and
    memory coupled to the one or more processors, the memory including one or more modules that are executable by the one or more processors to perform operations comprising:

setting a motor speed of a motor of the UAV;
generating a random value within a randomization threshold;
determining a randomized motor speed by applying the random value to the motor speed;
causing the motor of the UAV to operate at the randomized motor speed; and
determining that the UAV is operating within a position threshold associated with a flight path.

17. The UAV of claim 16, wherein the operations further comprise determining at least a portion of the flight path overlaps with at least one noise-sensitive location.

18. The UAV of claim 16, wherein the random value is a first random value, wherein the randomized motor speed is a first randomized motor speed, and wherein the operations further comprise:
operating the motor of the UAV at the first randomized motor speed for a first time period;
generating a second random value within the randomization threshold;
determining a second randomized motor speed by applying the second random value to the motor speed; and
causing the motor of the UAV to operate at the second randomized motor speed for a second time period after the first time period.

19. The UAV of claim 16, wherein the operations further comprise:
determining that the UAV is operating outside the position threshold associated with the flight path;
determining a corrective motor speed to operate the motor of the UAV; and
causing the motor of the UAV to operate at the corrective motor speed to return the UAV within the position threshold associated with the flight path.

20. The UAV of claim 16, wherein the motor of the UAV is a first motor of the UAV, wherein the motor speed is a first motor speed, wherein the random value is a first random value, wherein the randomized motor speed is a first randomized motor speed, and wherein the operations further comprise:
determining a second motor speed of a second motor of the UAV;
generating a second random value within the randomization threshold;
determining a second randomized motor speed by applying the second random value to the second motor speed; and
causing the second motor of the UAV to operate at the second randomized motor speed.

* * * * *